US009621838B2

(12) United States Patent
Yokawa et al.

(10) Patent No.: US 9,621,838 B2
(45) Date of Patent: Apr. 11, 2017

(54) DISPLAY DEVICE AND TELEVISION APPARATUS

(71) Applicant: Funai Electric Co., Ltd., Daito, Osaka (JP)

(72) Inventors: Akira Yokawa, Osaka (JP); Yuki Kita, Osaka (JP); Akihiro Fujikawa, Osaka (JP); Yasuyuki Fukumoto, Osaka (JP); Yasuhiro Mori, Osaka (JP); Yuto Suzuki, Osaka (JP); Hirofumi Horiuchi, Osaka (JP); Hirohiko Tsuji, Osaka (JP); Takahito Yamanaka, Osaka (JP); Hideo Yonezawa, Osaka (JP); Akifumi Kono, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 73 days.

(21) Appl. No.: 13/646,445

(22) Filed: Oct. 5, 2012

(65) Prior Publication Data
US 2013/0100357 A1    Apr. 25, 2013

(30) Foreign Application Priority Data

Oct. 25, 2011   (JP) ................. 2011-233763
Oct. 25, 2011   (JP) ................. 2011-234180

(51) Int. Cl.
*H04N 5/655*    (2006.01)
*G02F 1/1335*   (2006.01)
(Continued)

(52) U.S. Cl.
CPC ....... *H04N 5/655* (2013.01); *G02F 1/133308* (2013.01); *G02F 1/133615* (2013.01);
(Continued)

(58) Field of Classification Search
CPC ... G02F 1/133308; G02F 2001/133314; G02F 2001/133317; G02F 2001/133322;
(Continued)

(56) References Cited

U.S. PATENT DOCUMENTS

2004/0252254 A1* 12/2004 Koo ................. G02F 1/133308
                                                        349/58
2006/0254107 A1* 11/2006 Watanabe ....................... 40/768
(Continued)

FOREIGN PATENT DOCUMENTS

CN       101753932 A      6/2010
EP         2037316 A1     3/2009
(Continued)

OTHER PUBLICATIONS

Nitto, Eiji. Liquid Crystal Display Device. Machine Translation of JP 2006-330599 from JPO AIPN website. All pages.*
(Continued)

*Primary Examiner* — Dennis Y Kim
(74) *Attorney, Agent, or Firm* — Global IP Counselors, LLP

(57) ABSTRACT

A display device includes a light source, a reflection sheet, a display panel and a display panel supporting member. The display panel supporting member is disposed on a back side of the display device relative to the reflection sheet. A part of a back surface of the display panel supporting member disposed on the back side of the display device relative to the reflection sheet forms a rear chassis. The display panel supporting member has a first recessed portion that is recessed toward the reflection sheet such that the first recessed portion presses an inner area of a back surface of the reflection sheet except for a vicinity of an outer peripheral portion of the back surface of the reflection sheet.

15 Claims, 22 Drawing Sheets

(51) Int. Cl.
*G02F 1/1333* (2006.01)
*F21V 8/00* (2006.01)

(52) U.S. Cl.
CPC .......... *G02B 6/0055* (2013.01); *G02B 6/0088* (2013.01); *G02F 2001/133314* (2013.01); *G02F 2001/133628* (2013.01)

(58) Field of Classification Search
CPC .. G02F 1/1335; G02F 1/133553; G02F 1/157; G02F 2201/34; G02F 1/13338; G02F 1/133382; H04N 5/655; G02B 6/0055
USPC .......................................................... 349/58
See application file for complete search history.

(56) References Cited

U.S. PATENT DOCUMENTS

| | | | |
|---|---|---|---|
| 2007/0165420 A1* | 7/2007 | Weng .................. | G02B 6/0031 362/609 |
| 2008/0198300 A1* | 8/2008 | Okumura et al. ............. | 349/68 |
| 2009/0128732 A1 | 5/2009 | Hamada | |
| 2010/0066937 A1* | 3/2010 | Yamashita et al. ............ | 349/58 |
| 2010/0073598 A1* | 3/2010 | Masuda ......................... | 349/62 |
| 2010/0073959 A1* | 3/2010 | Hamada ............... | G02B 6/0085 362/611 |
| 2012/0092593 A1* | 4/2012 | Chang et al. .................. | 349/67 |
| 2012/0224117 A1* | 9/2012 | Miyazaki et al. .............. | 349/58 |

FOREIGN PATENT DOCUMENTS

| | | | |
|---|---|---|---|
| EP | 2390693 A1 | | 11/2011 |
| EP | 2500765 A1 | | 9/2012 |
| EP | 2582218 A1 | | 4/2013 |
| JP | 07-325302 A | | 12/1995 |
| JP | 2002-093632 A | | 3/2002 |
| JP | 2002-133935 A | | 5/2002 |
| JP | 2003-051681 A | | 2/2003 |
| JP | 2003-167235 A | | 6/2003 |
| JP | 2003-346535 A | | 12/2003 |
| JP | 2005-024875 A | | 1/2005 |
| JP | 2006-330599 A | | 12/2006 |
| JP | 2006330599 A | * | 12/2006 |
| JP | 2009-245882 A | | 10/2009 |
| JP | 2010-54718 A | | 3/2010 |
| JP | 2010-72262 A | | 4/2010 |

OTHER PUBLICATIONS

Partial European Search Report of the corresponding European Application No. 12189657.5, dated Feb. 28, 2013.
Extended European Search Report of the corresponding European Application No. 12189657.5, dated Nov. 29, 2013.

* cited by examiner

DISPLAY DEVICE AND TELEVISION APPARATUS

CROSS-REFERENCE TO RELATED APPLICATIONS

This application claims priority to Japanese Patent Application Nos. 2011-233763 filed on Oct. 25, 2011 and 2011-234180 filed on Oct. 25, 2011. The entire disclosure of Japanese Patent Application Nos. 2011-233763 and 2011-234180 are hereby incorporated herein by reference.

BACKGROUND

Field of the Invention

This invention generally relates to a display device. More specifically, this invention relates to a display device with a reflection sheet. Furthermore, this invention relates to a television apparatus.

Background Information

Conventional display devices and television apparatuses provided with a reflection sheet are known (see Japanese Laid-Open Patent Application Publication No. 2003-167235 (Patent Citation 1), for example).

This Patent Citation 1 discloses a liquid crystal display device provided with a front chassis and a rear chassis. In this liquid crystal display device, a liquid crystal display panel, an optical sheet, a light guide plate and a reflection sheet are provided between the front and rear chassis in this order from the front side. The front chassis has a frame-shaped portion that holds the front surface of the liquid crystal display panel and an L-shaped hook that holds the back surface of the reflection sheet. The L-shaped hook extends from the back surface of the frame-shaped portion of the front chassis backward (in the direction of the rear chassis). The L-shaped hook is configured to press the vicinity of the outer peripheral portion of the back surface of the reflection sheet.

Another conventional display devices provided with a reflection sheet are also known (see Japanese Laid-Open Patent Application Publication No. 2003-346535 (Patent Citation 2), for example).

This Patent Citation 2 discloses a display device provided with a light emitter, a light guide plate, a reflection sheet, and a rear chassis. The light emitter has a fluorescent discharge tube and the like. The light guide plate emits light, that enters from the light emitter to a side surface thereof, from the upper surface thereof. The reflection sheet covers back surfaces of the light emitter and the light guide plate. The rear chassis houses the light emitter, the light guide plate, and the reflection sheet. The rear chassis of the display device is made of a metal plate. A reflection sheet abutting portion is formed in the rear chassis by drawing processing. The reflection sheet abutting portion and the reflection sheet abuts each other.

SUMMARY

The reflection sheet of the display device need to be properly supported to the display device for properly reflecting the light.

One object of the present disclosure is to provide a display device in which a reflection sheet is properly supported.

In view of the state of the know technology, a display device includes a light source, a reflection sheet, a display panel and a display panel supporting member. The light source is configured to emit light. The reflection sheet is configured to reflect the light emitted from the light source to a front side of the display device. The display panel is arranged relative to the reflection sheet. The display panel supporting member supports the display panel. The display panel supporting member is disposed on a back side of the display device relative to the reflection sheet with the back side of the display device being an opposite side to the front side of the display device. A part of a back surface of the display panel supporting member disposed on the back side of the display device relative to the reflection sheet forms a rear chassis. The display panel supporting member has a first recessed portion that is recessed toward the reflection sheet such that the first recessed portion presses an inner area of a back surface of the reflection sheet except for a vicinity of an outer peripheral portion of the back surface of the reflection sheet.

Other objects, features, aspects and advantages of the present disclosure will become apparent to those skilled in the art from the following detailed description, which, taken in conjunction with the annexed drawings, discloses selected embodiments of the display device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring to FIGS. 1 through 10, a liquid crystal television apparatus 100 in accordance with a first embodiment will be described. The liquid crystal television apparatus 100 is an example of the "display device" and the "television apparatus."

With the conventional liquid crystal display device described in the Patent Citation 1, the vicinity of the outer peripheral portion of the reflection sheet is pressed by the L-shaped hook formed on the back surface of the frame-shaped portion of the front chassis. In other words, an inner area of the back surface of the reflection sheet is not pressed. Thus, it has been discovered that the inner area of the reflection sheet become spaced apart backward from the light guide plate.

The liquid crystal television apparatus 100 is made to address the above-described circumstances. With the liquid crystal television apparatus 100, an inner area of a reflection sheet can be prevented from being spaced apart backward, which will be discussed later in detail.

Figure 1:
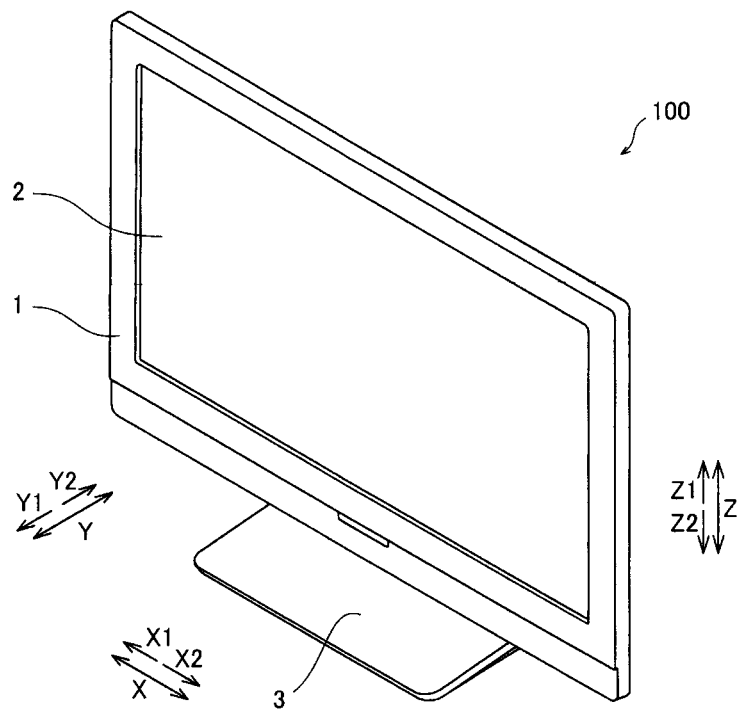
FIG. 1 is a front perspective view of a liquid crystal television apparatus in accordance with a first embodiment.
Figure 2:
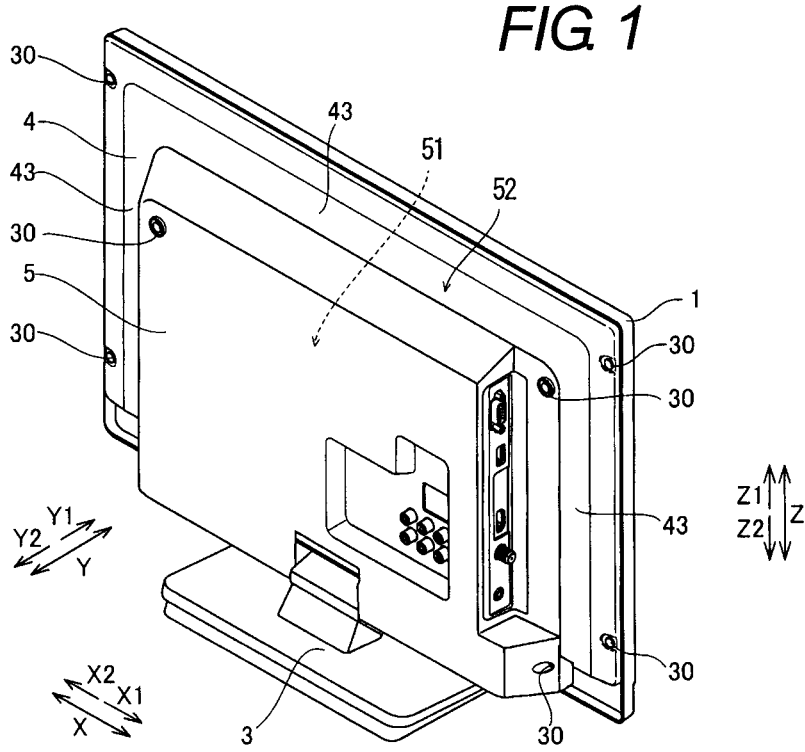
FIG. 2 is a rear perspective view of the liquid crystal television apparatus illustrated in FIG. 1.

As shown in FIGS. 1 and 2, the liquid crystal television apparatus 100 has a frame-shaped front chassis 1, a liquid crystal display panel 2, and a stand member 3. The front chassis 1 has a rectangular shape. The liquid crystal display panel 2 is housed in the front chassis 1, and has a display screen on an arrow Y1 side. The stand member 3 supports the liquid crystal television apparatus 100 as a whole. The front chassis 1 and the stand member 3 are both made of resin. In the following explanations, the display screen side of the liquid crystal display panel 2 is a front side of the liquid crystal television apparatus 100 (e.g., a front surface side or the arrow Y1 side), and the opposite side of the display screen side of the liquid crystal display panel 2 is a back side of the liquid crystal television apparatus 100 (e.g., a back surface side or an arrow Y2 side).

Furthermore, an arrow X indicates a widthwise or longitudinal direction (e.g., first direction) of the liquid crystal television apparatus 100, an arrow Y indicates a front to back direction of the liquid crystal television apparatus 100, and an arrow Z indicates a height or short-side direction of the liquid crystal television apparatus 100. Moreover, arrows X1 and X2 indicate left and right sides of the liquid crystal television apparatus 100 along the widthwise direction X from the perspective of viewing the liquid crystal display panel 2 from the arrow Y1 side (or front side), respectively, while arrows Z1 and Z2 indicate upper and lower sides of the liquid crystal television apparatus 100 along the height direction Z, respectively.

The liquid crystal television apparatus 100 further includes a display panel supporting member 4 (e.g., rear frame). The display panel supporting member 4 is made of sheet metal, such as SECC (steel electrolytic cold commercial or electrolytic zinc-coated steel sheet). The display panel supporting member 4 is provided on the back surface side of the front chassis 1 (i.e., on the arrow Y2 side). The display panel supporting member 4 has a rectangular shape viewed from the back, and is formed to be smaller than the front chassis 1.

Figure 3:
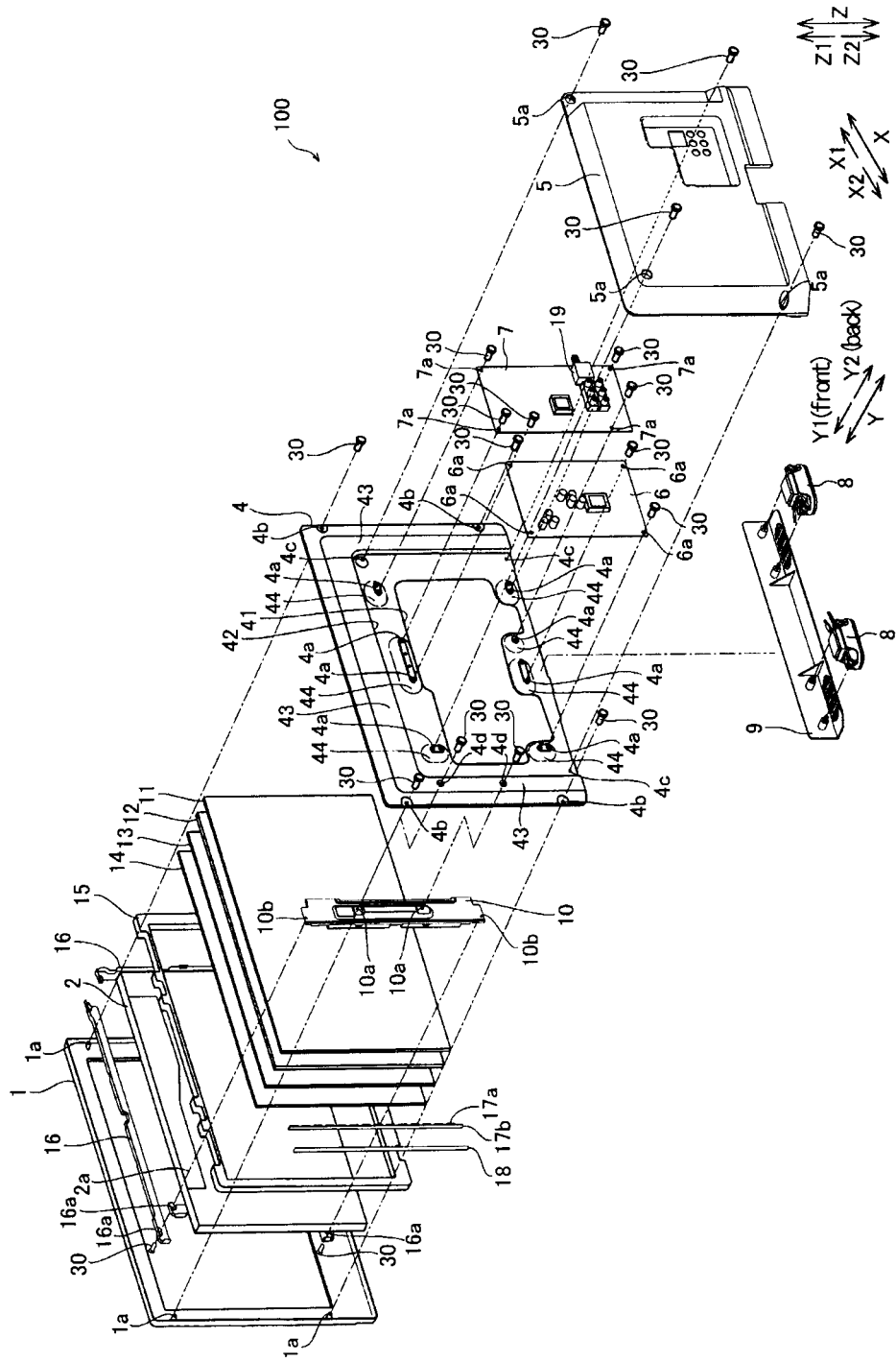
FIG. 3 is an exploded perspective view of the liquid crystal television apparatus illustrated in FIG. 1.
Figure 4:
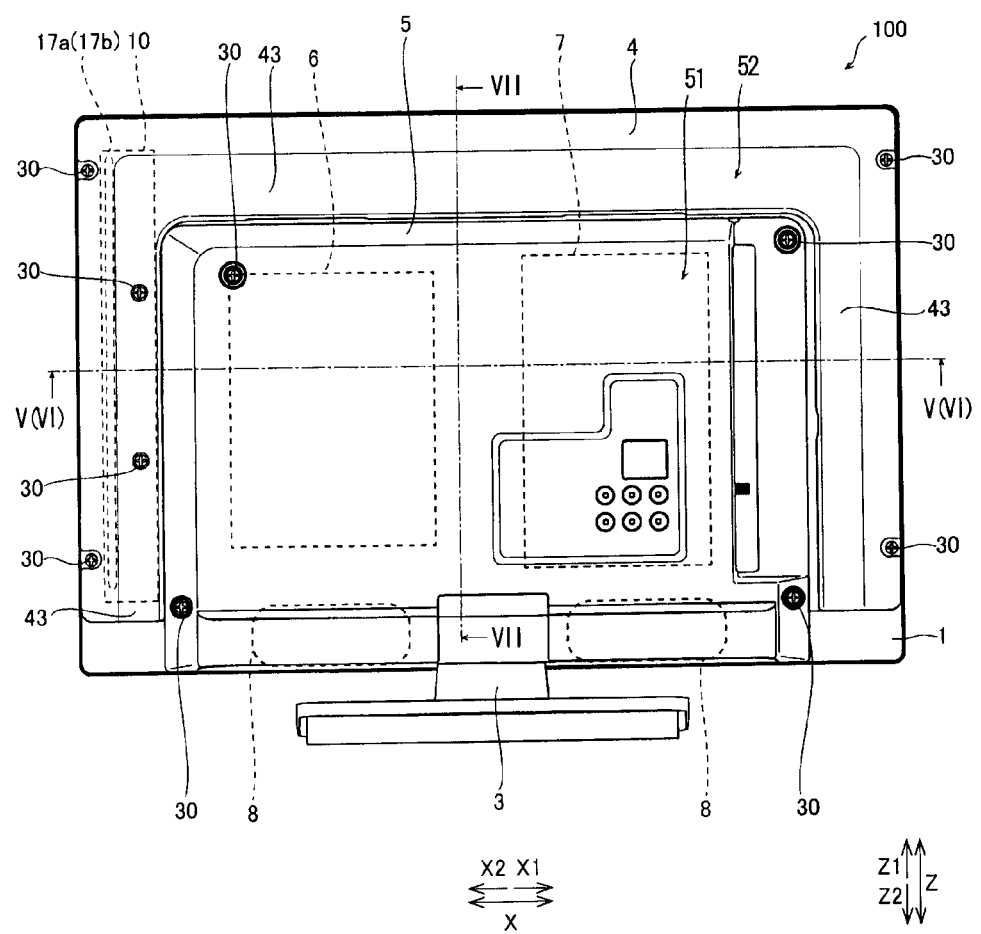
FIG. 4 is a rear elevational view of the liquid crystal television apparatus illustrated in FIG. 1.

As shown in FIG. 3, the liquid crystal television apparatus 100 further has a cover member 5. The cover member 5 is made of resin. The cover member 5 is attached to a back surface (i.e., a rear surface on the arrow Y2 side) of the metal display panel supporting member 4. The cover member 5 has a rectangular shape viewed from the back, and is formed to be smaller than the front chassis 1 and the display panel supporting member 4. Also, as shown in FIG. 4, the cover member 5 covers the back surface of the display panel supporting member 4 such that a vicinity of an outer peripheral portion of the back surface of the display panel supporting member 4 is exposed in an inverted shape viewed from the back. The display panel supporting member 4 has an area 51 covered by the cover member 5 and an area 52 exposed from the cover member 5. The rear chassis is constructed of the area 52 exposed from the cover member 5, and the cover member 5. In other words, the area 52 that is a part of the back surface of the display panel supporting member 4 forms the rear chassis of the liquid crystal television apparatus 100.

As shown in FIG. 3, the liquid crystal television apparatus 100 further has a pair of circuit boards 6 and 7. The circuit board 6 has the function of supplying power to the apparatus as a whole, while the circuit board 7 has the function of signal processing. The circuit boards 6 and 7 are attached to the area 51 covered by the cover member 5 of the back surface of the display panel supporting member 4 in an arrangement spaced apart from each other at a predetermined distance in the widthwise direction X. Furthermore, as shown in FIG. 3, the liquid crystal television apparatus 100 further has a pair of speakers 8 and a speaker attachment member 9 to which the speakers 8 are attached. The speaker attachment member 9 is also attached to a lower portion (i.e., arrow Z2 side) of the back surface of the display panel supporting member 4.

As shown in FIG. 3, the liquid crystal television apparatus 100 further has a heat sink 10, a refection sheet 11, a light guide plate 12, a light diffusing sheet 13, a lens sheet 14, a frame-shaped resin frame 15, a plurality of (four in this embodiment) bezels 16, and a LED (Light Emitting Diode) light source 17a (e.g., light source). The heat sink 10, the refection sheet 11, the light guide plate 12, the light diffusing sheet 13, the lens sheet 14, the frame-shaped resin frame 15, the liquid crystal display panel 2, the bezels 16 are arranged in front of the display panel supporting member 4 (i.e., on the arrow Y1 side). The heat sink 10 is made of sheet metal, such as SECC. The reflection sheet 11 reflects light emitted from the LED light source 17a described below. The light guide plate 12 and the light diffusing sheet 13 diffuse light emitted from the LED light source 17a. The lens sheet 14 collects light. Furthermore, the liquid crystal television apparatus 100 has a liquid crystal panel driving board 2a that drives the liquid crystal display panel 2.

Figure 5:
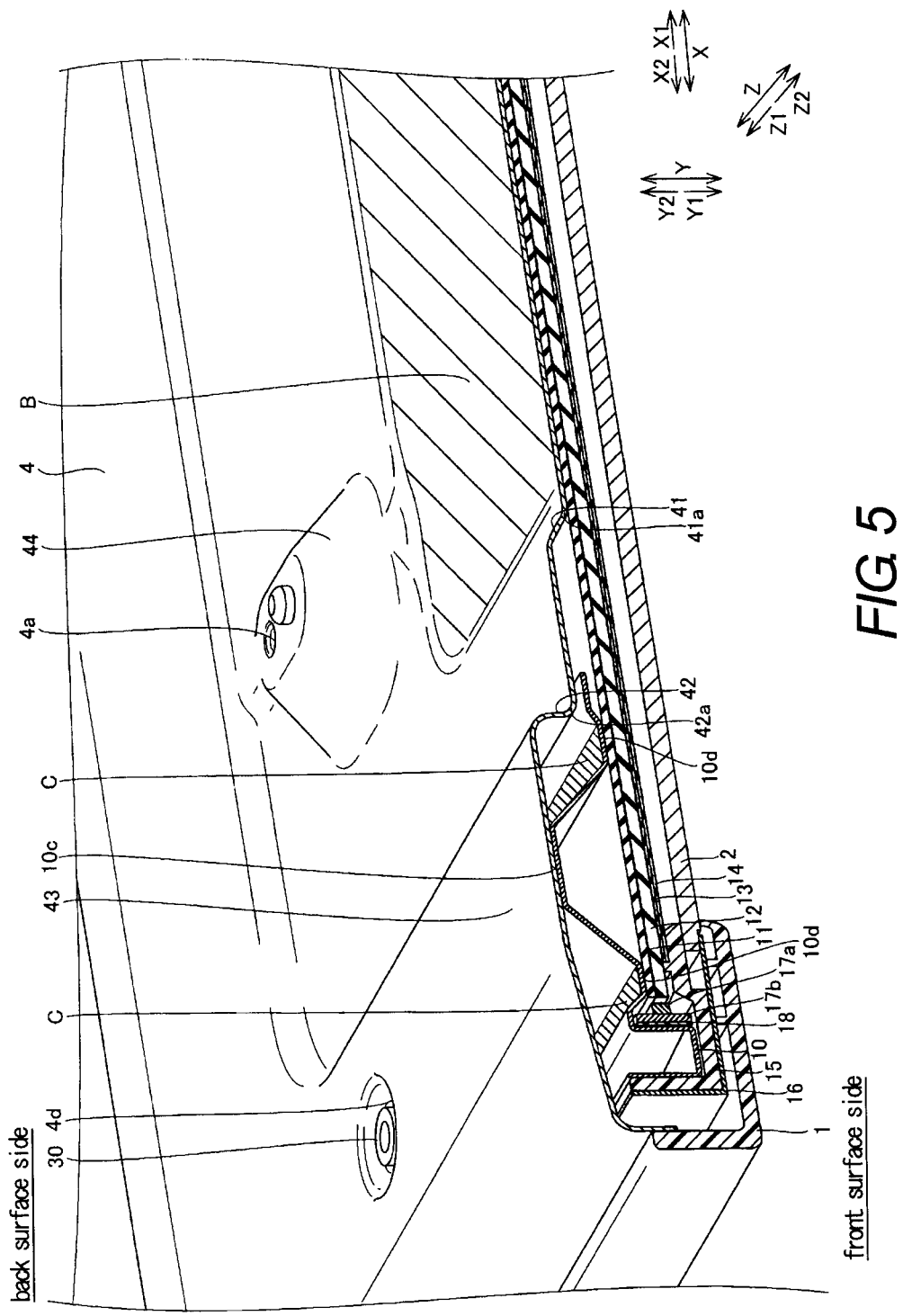
FIG. 5 is a partial cross sectional perspective view of the liquid crystal television apparatus taken along V-V line in FIG. 4.
Figure 6:
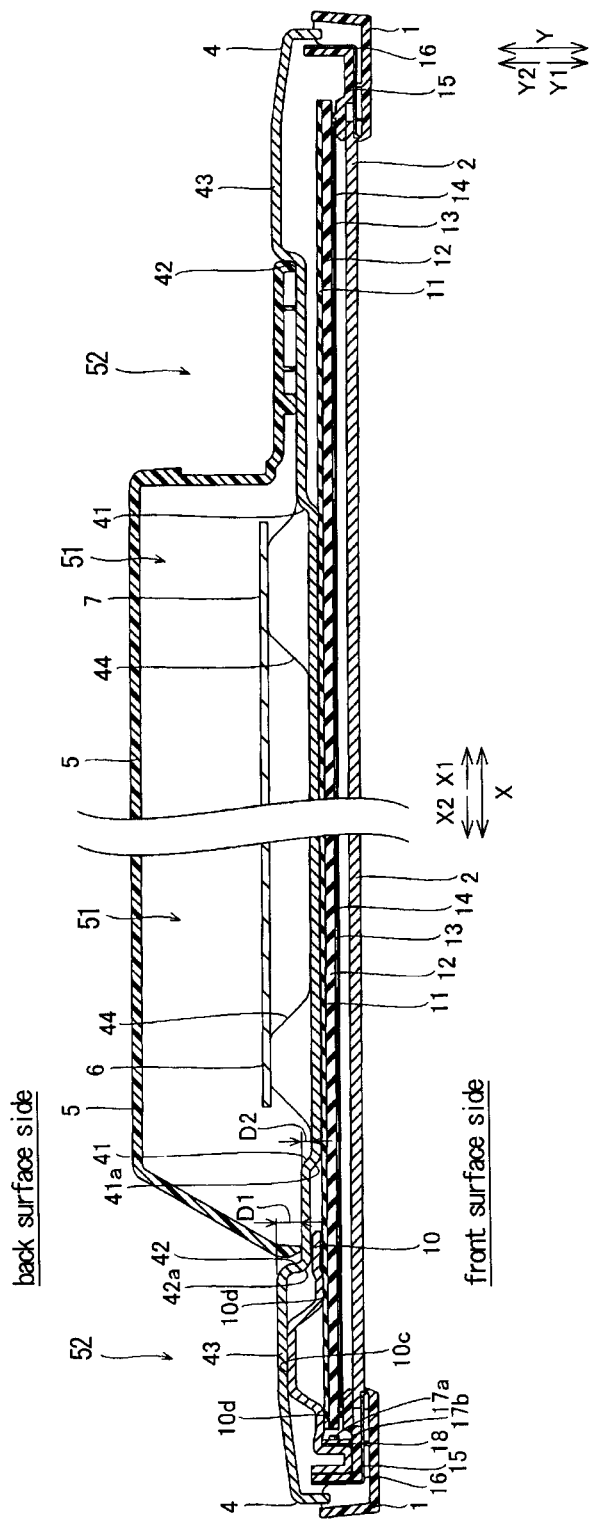
FIG. 6 is a cross sectional view of the liquid crystal television apparatus taken along VI-VI line in FIG. 4.
Figure 7:
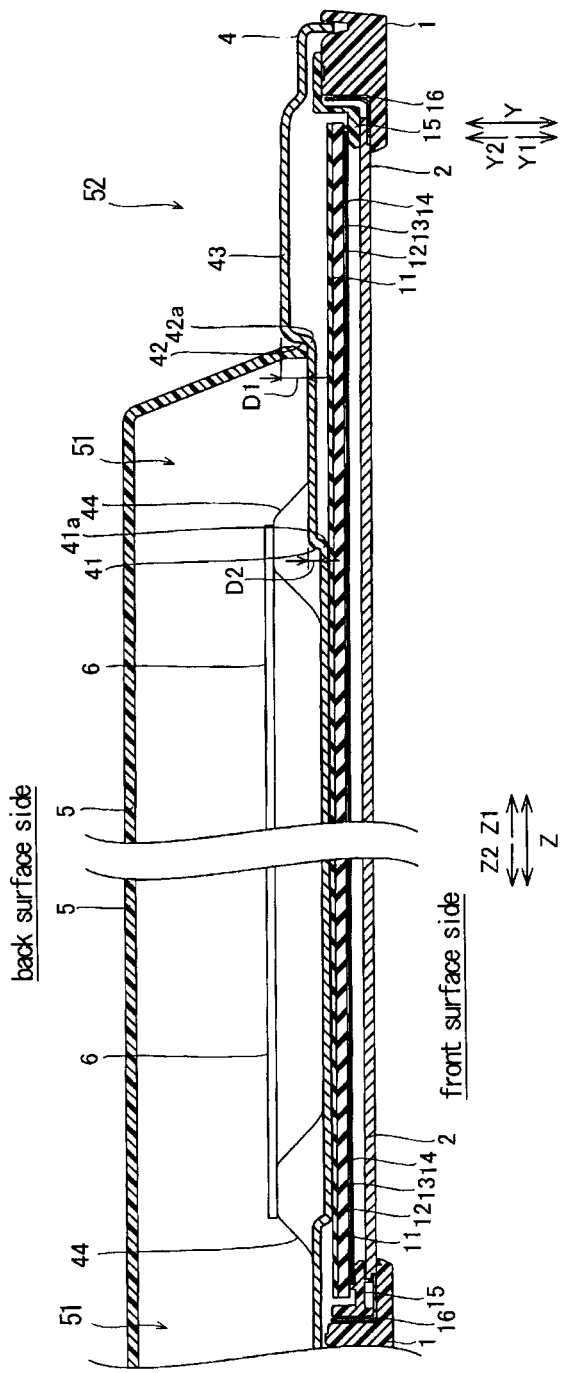
FIG. 7 is a partial cross sectional view of the liquid crystal television apparatus taken along line VII-VII in FIG. 4.

As shown in FIG. 5 and FIG. 6, the LED light source 17a for a back light with a plurality of LEDs is provided on the side of the light guide plate 12 (i.e., in the arrow X2 direction). The LED light source 17a emits light. The LED light source 17a is attached to a surface of an LED board 17b on the arrow X1 side. A surface of the LED board 17b on the arrow X2 side (i.e., the opposite surface of the surface to which the LED light source 17a is attached) is attached to a surface of the heat sink 110 on the arrow X1 side through a heat release tape or sheet 18.

In the present embodiment, as shown in FIG. 5 through FIG. 9, the display panel supporting member 4 has a first recessed portion 41 that is recessed toward the reflection sheet 11 (i.e., the arrow Y1 direction) so as to press an inner area (i.e., a shaded portion A in FIG. 9) of the back surface of the reflection sheet 11 except for the vicinity of an outer peripheral portion of the back surface of the reflection sheet 11. The first recessed portion 41 has a substantially rectangular shape viewed from the back. Also, the first recessed portion 41 is covered by the cover member 5. The front surface of the first recessed portion 41 (i.e., a shaded portion B in FIG. 8) surface-contacts with the inner area (i.e., the shaded portion A in FIG. 9) of the back surface of the reflection sheet 11 except for the vicinity of the outer peripheral portion of the back surface of the reflection sheet 11 at a contact area of the front surface of the first recessed portion 41. Also, the inner area (i.e., the shaded portion A in FIG. 9) of the reflection sheet 11 is pressed (or pressure is applied) against the light guide plate 12 provided in front of the reflection sheet 11 by the front surface of the first recessed portion 41 (i.e., the shaded portion B in FIG. 8).

Figure 8:
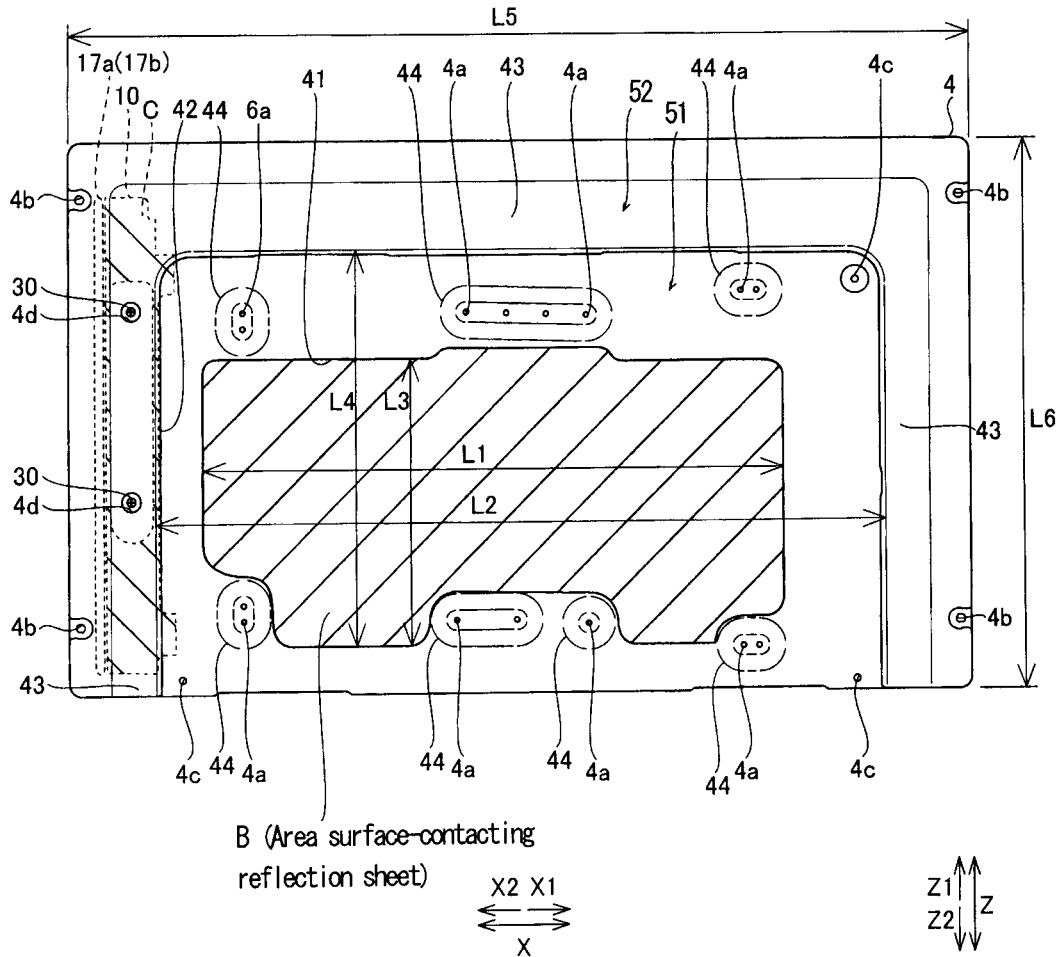
FIG. 8 is a rear elevational view of a display panel supporting member of the liquid crystal television apparatus illustrated in FIG. 1.

As shown in FIG. 8, the display panel supporting member 4 has a second recessed portion 42 formed to surround the first recessed portion 41. The second recessed portion 42 is configured such that the outer edge portion of the cover member 5 fits thereinto. A depth D1 of the second recessed portion 42 of the display panel supporting member 4 is larger than a depth D2 of the first recessed portion 41 of the display panel supporting member 4.

As shown in FIG. 8, a length L1 in the longitudinal direction X of the first recessed portion 41 of the display panel supporting member 4 is smaller than a length L2 in the longitudinal direction X of the second recessed portion 42 of the display panel supporting member 4. The length L1 in the longitudinal direction X of the first recessed portion 41 is equal to or greater than about three-fourths of the length L2 in the longitudinal direction X of the second recessed portion 42.

A length L3 in the short-side direction Z of the first recessed portion 41 of the display panel supporting member 4 is smaller than a length L4 in the short-side direction Z of the second recessed portion 42 of the display panel supporting member 4. The length L3 in the short-side direction Z of the first recessed portion 41 is equal to or greater than about two-thirds of the length L4 in the short-side direction Z of the second recessed portion 42.

The length L1 in the longitudinal direction X of the first recessed portion 41 of the display panel supporting member 4 is smaller than a length L5 in the longitudinal direction X of the entire display panel supporting member 4. The length L1 in the longitudinal direction X of the first recessed portion 41 is equal to or greater than a half of the length L5 in the longitudinal direction X of the entire display panel supporting member 4.

The length L3 in the short-side direction Z of the first recessed portion 41 of the display panel supporting member 4 is smaller than a length L6 in the short-side direction Z of the entire display panel supporting member 4. The length L3 in the short-side direction Z of the first recessed portion 41 of the display panel supporting member 4 is equal to or greater than a half of the length L6 in the short-side direction Z of the entire display panel supporting member 4.

Figure 9:
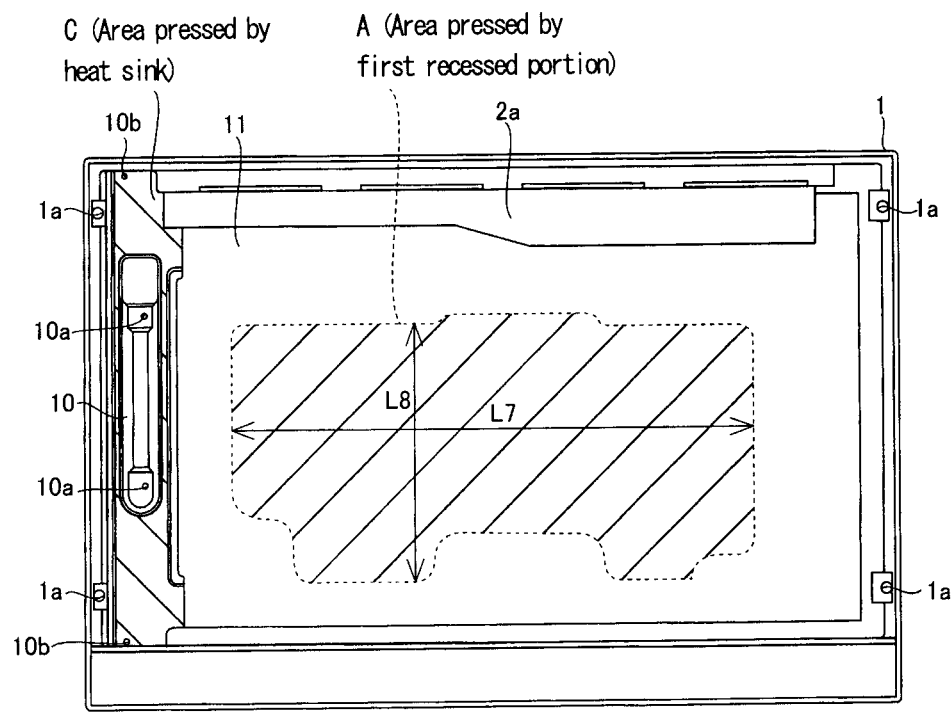
FIG. 9 is a rear elevational view of a heat sink and a reflection sheet of the liquid crystal television apparatus illustrated in FIG. 1.

As shown in FIG. 9, a length L7 in the longitudinal direction X of the area (i.e., the shaded portion A in FIG. 9) of the back surface of the reflection sheet 11 pressed by the first recessed portion 41 (see FIG. 8) of the display panel supporting member 4 is smaller than the length L5 in the longitudinal direction X of the entire display panel supporting member 4. The length L7 in the longitudinal direction X of the area of the back surface of the reflection sheet 11 pressed by the first recessed portion 41 is equal to or greater than a half of the length L5 in the longitudinal direction X of the entire display panel supporting member 4.

A length L8 in the short-side direction Z of the area (i.e., the shaded portion A in FIG. 9) of the back surface of the reflection sheet 11 pressed by the first recessed portion 41 (see FIG. 8) of the display panel supporting member 4 is smaller than the length L6 in the short-side direction Z of the entire display panel supporting member 4 (see FIG. 8). The length L8 in the short-side direction Z of the area of the back surface of the reflection sheet 11 pressed by the first recessed portion 41 of the display panel supporting member 4 is equal to or greater than a half of the length L6 in the short-side direction Z of the entire display panel supporting member 4.

The first recessed portion 41 and the second recessed portion 42 of the display panel supporting member 4 are formed by drawing processing. The cross-sectional shape of an area (i.e., a curved surface portion 41a) (see FIG. 6 and FIG. 7) corresponding to the outer edge portion of the contact area (i.e., the shaded portion B in FIG. 8), that surface-contacts the back surface of the reflection sheet 11, of the front surface of the first recessed portion 41 of the display panel supporting member 4 has a curved surface shape. The cross-sectional shape of an area Le., a curved surface portion 42a) (see FIG. 6 and FIG. 7) in the vicinity of an area of the second recessed portion 42 of the display panel supporting member 4 into which the cover member 5 fits has a curved surface shape. More specifically, the curvature radii of the curved surface portion 41a of the first recessed portion 41 and the curved surface portion 42a of the second recessed portion 42 are equal to or greater than about 3 R and equal to or smaller than about 6 R, where R is the thickness of the display panel supporting member 4.

As shown in FIG. 6 and FIG. 8, the display panel supporting member 4 has a bulge portion 43 formed to bulge toward the back side (i.e., the arrow Y2 side) along three sides of the outer peripheral portion of the display panel supporting member 4. Specifically, the bulge portion 43 is formed in the vicinity of three sides of the second recessed portion 42 on the arrow X2 side, the arrow X1 side, and the arrow Z1 side. The bulge portion 43 is provided in the area 52 of the display panel supporting member 4 exposed from the cover member 5. The mechanical strength of the display panel supporting member 4 is increased by the bulge portion 43 formed along three sides of the outer peripheral portion of the display panel supporting member 4, which results in maintaining the strength of the display panel supporting member 4 forming the rear chassis.

The heat sink 10 is provided between a front surface (i.e., a surface on the arrow Y1 side) of the bulge portion 43 formed on the arrow X2 side of the display panel supporting member 4 and the back surface of the reflection sheet 11. The front surface of the bulge portion 43 formed on the arrow X2 side of the display panel supporting member 4 surface-contacts a back surface 10c (i.e., a surface on the arrow Y2 side) of the heat sink 10. The height position of a back surface (i.e., a surface on the arrow Y2 side) of the bulge portion 43 formed on the arrow X1 side of the display panel supporting member 4 is substantially equal to the height position of a portion of the back surface of the cover member 5 corresponding to the vicinity of the second recessed portion 42.

As shown in FIG. 9, the heat sink 10 is formed to extend along the short-side direction Z (a side in Z direction) of the display panel supporting member 4 viewed from the back. In the present embodiment, as shown in FIG. 5 and FIG. 6, the area (i.e., the shaded portion C in FIG. 5, FIG. 8 and FIG. 9) on the arrow X2 side of the back surface of the reflection sheet 11 is pressed (pressure is applied) against the light guide plate 12 by a front surface 10d (a surface on the arrow Y1 side) of the heat sink 10. Specifically, in the present embodiment, the back surface of the reflection sheet 11 is pressed against the light guide plate 12 by the first recessed portion 41 of the display panel supporting member 4 and the front surface 10d of the heat sink 10.

As shown in FIG. 3, a plurality of board attachment portions 44 to which the circuit board 6 and the circuit board 7 are attached respectively are formed in the outer peripheral portion of the first recessed portion 41 of the display panel supporting member 4. Each of the board attachment portions 44 is formed to be projected toward the cover member 5. Also, a board attachment threaded hole 4a is formed in each of the board attachment portions 44.

A plurality of screw insertion holes 6a for inserting a screw 30 are formed in the outer edge portion of the circuit board 6. The circuit board 6 is fixed to the display panel supporting member 4 by fastening each of the screws 30 into the board attachment threaded hole 4a of the board attachment portion 44 of the display panel supporting member 4 through the screw insertion hole 6a of the circuit board 6.

A plurality of screw insertion holes 7a for inserting the screw 30 are formed in the outer edge portion of the circuit board 7. The circuit board 7 is fixed to the display panel supporting member 4 by fastening each of the screws 30 into the board attachment threaded hole 4a of the board attachment portion 44 of the display panel supporting member 4 through the screw insertion hole 7a of the circuit board 7.

A plurality of cover member attachment threaded holes 4c for attaching the cover member 5 are formed in the back surface (i.e., a bottom surface) of the display panel supporting member 4. A plurality of screw insertion holes 5a are formed in the cover member 5. The cover member 5 is fixed to the display panel supporting member 4 by fastening each of the screws 30 into the cover member attachment threaded hole 4c of the display panel supporting member 4 through the screw insertion hole 5a of the cover member 5. Viewed from the back, the screw 30 fastened into the screw insertion hole 5a located at the upper left of the cover member 5 is fastened into the board attachment threaded hole 4a at the upper left of the display panel supporting member 4 through the screw insertion hole 6a at the upper left of the circuit board 6.

The cover member 5 is attached by the screws 30 to the cover member attachment threaded holes 4c formed in the lower portion (in the arrow Z2 direction) among the cover member attachment threaded holes 4c formed in the back surface of the display panel supporting member 4 such that the speaker attachment member 9 is sandwiched therebetween. Also, the cover member 5 is attached to cover the circuit board 6, the circuit board 7, and the speaker attachment member 9 to which the two speakers 8 are attached, from the back.

A plurality of screw insertion holes 4b are formed in the back surface (i.e., the bottom surface) of the display panel supporting member 4 along the outer edge portion thereof. The display panel supporting member 4 is fixed to the front chassis 1 by fastening the screws 30 into a plurality of rear chassis attachment threaded holes 1a of the front chassis 1 through the screw insertion holes 4b of the display panel supporting member 4.

As shown in FIG. 3, two rear chassis attachment threaded holes 10a for attaching the display panel supporting member 4 are formed in the back surface (i.e., the surface on the arrow Y2 side) of the heat sink 10. Two screw insertion holes 4d for attaching the screw 30 are formed in the area in the vicinity of the side of the display panel supporting member 4 on the arrow X2 side. The display panel supporting member 4 and the heat sink 10 are fixed to each other by fastening the screws 30 into the rear chassis attachment threaded holes 10a of the heat sink 10 through the screw insertion holes 4d of the display panel supporting member 4.

Bezel attachment threaded holes 10b for attaching the bezel 16 are formed in the upper end portion and the lower end portion of the heat sink 10. Screw insertion holes 16a for attaching the screw 30 are formed in the bezels 16. The bezels 16 and the heat sink 10 are fixed to each other by fastening the screws 30 into the bezel attachment threaded holes 10b of the heat sink 10 through the screw insertion holes 16a of the bezels 16.

Figure 10:
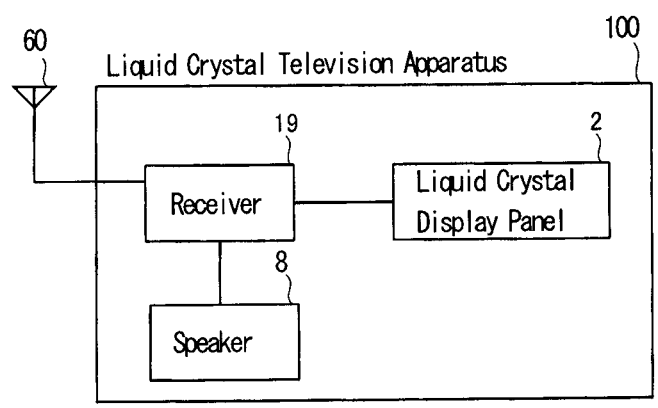
FIG. 10 is a block diagram of the liquid crystal television apparatus illustrated in FIG. 1.

The circuit board 7 for signal processing attached to the display panel supporting member 4 has a receiver or tuner 19 capable of receiving a television broadcast. As shown in FIG. 10, the receiver 19 is connected to the liquid crystal display panel 2 and the speakers 8, and configured to output to the liquid crystal display panel 2 a video signal from the television broadcast signal (video signal and audio signal) received by an antenna 60 and output an audio signal to the speakers 8.

In the present embodiment, as described above, the display panel supporting member 4 has the first recessed portion 41 (i.e., the shaded portion B in FIG. 8) that is recessed toward the reflection sheet 11 an as to press the inner area (i.e., the shaded portion A in FIG. 9) of the back surface of the reflection sheet 11 except for the vicinity of the outer peripheral portion of the back surface of the reflection sheet 11. Accordingly, the inner area of the back surface of the reflection sheet 11 can be pressed by the first recessed portion 41 of the display panel supporting member 4, and thus the inner area of the reflection sheet 11 can be prevented from being spaced apart backward, unlike in the case of pressing only the vicinity of the outer peripheral portion of the reflection sheet 11, for example. Also, since the inner area of the back surface of the reflection sheet 11 can be pressed by the first recessed portion 41 of the display panel supporting member 4, it is not necessary to provide a member exclusive for pressing the reflection sheet 11 separately.

In the present embodiment, as described above, the front surface (i.e., the shaded portion B in FIG. 8) of the first recessed portion 41 of the display panel supporting member 4 presses the inner area (i.e., the shaded portion A in FIG. 9) of the back surface of the reflection sheet 11 except for the vicinity of the outer peripheral portion of the back surface of the reflection sheet 11 in a state of surface-contacting the inner area of the back surface of the reflection sheet 11 except for the vicinity of the outer peripheral portion of the back surface of the reflection sheet 11. Consequently, the area of pressing the reflection sheet 11 can be made larger compared to the case where the front surface of the first recessed portion 41 of the display panel supporting member 4 point-contacts or line-contacts the inner area of the back surface of the reflection sheet 11 except for the vicinity of the outer peripheral portion of the back surface of the reflection sheet 11, which makes it possible to securely prevent the inner area of the reflection sheet 11 from being spaced apart backward.

In the present embodiment, as described above, the front surface of the first recessed portion 41 of the display panel supporting member 4 is configured such that the area corresponding to the outer edge portion of the area of the front surface of the first recessed portion 41 that surface-contacts the back surface of the reflection sheet 11 has a curved cross-sectional shape. It is thus possible to prevent the vicinity of the area corresponding to the outer edge portion of the area, that surface-contacts the front surface of the first recessed portion 41 of the display panel supporting member 4, of the back surface of the reflection sheet 11 from being compressed unlike in the case where the front surface of the first recessed portion 41 of the display panel supporting member 4 is configured such that the area corresponding to the outer edge portion of the area of the front surface of the first recessed portion 41 that surface-contacts the back surface of the reflection sheet 11 has an L-shaped (e.g., right angle) cross-sectional shape, for example, instead of a curved cross-sectional shape.

In the present embodiment, as described above, the first recessed portion 41 of the display panel supporting member 4 presses the inner area (i.e., the shaded portion A in FIG. 9) of the back surface of the reflection sheet 11 except for the vicinity of the outer peripheral portion of the back surface of the reflection sheet 11, and in addition to that, the heat sink 10 presses the vicinity of the outer peripheral portion of the back surface of the reflection sheet 11. Consequently, both of the inner area the shaded portion A in FIG. 9) and the vicinity of the outer peripheral portion of the back surface of the reflection sheet 11 are pressed by the first recessed portion 41 and the heat sink 10, so that the reflection sheet 11 can more securely be pressed. Also, since the vicinity of the outer peripheral portion of the reflection sheet 11 can be pressed by the heat sink 10 that releases heat generated from the LED light source 17a, it is not necessary to provide a member exclusive for pressing the vicinity of the outer peripheral portion of the reflection sheet 11 separately.

In the present embodiment, as described above, the cover member 5 is provided to fit into the second recessed portion 42 of the display panel supporting member 4, and is provided to cover the first recessed portion 41 of the display panel supporting member 4. Consequently, when the circuit board 6 and the circuit board 7 are provided on the first recessed portion 41, the circuit board 6 and the circuit board 7 can be concealed by the cover member 5, and the circuit board 6 and the circuit board 7 provided on the first recessed portion 41 can be prevented from being observed by a user.

In the present embodiment, as described above, the depth D1 of the second recessed portion 42 of the display panel supporting member 4 is larger than the depth D2 of the first recessed portion 41 of the display panel supporting member 4. Consequently, the cover member 5 can easily be attached to the second recessed portion 42 compared to the case where the depth D1 of the second recessed portion 42 of the display panel supporting member 4 is smaller than the depth D2 of the first recessed portion 41 of the display panel supporting member 4 because an inner side surface of the second recessed portion 42 can serve as a guide when the cover member 5 is attached to the second recessed portion 42.

In the present embodiment, as described above, the display panel supporting member 4 is made of sheet metal, and the first recessed portion 41 and the second recessed portion 42 of the display panel supporting member 4 are formed by drawing processing. Consequently, the first recessed portion 41 and the second recessed portion 42 can easily be formed on the display panel supporting member 4 by drawing processing.

In the present embodiment, as described above, the length 17 in the longitudinal direction X of the area of the back surface of the reflection sheet 11 pressed by the first recessed portion 41 of the display panel supporting member 4 is equal to or greater than a half of the length L5 in the longitudinal direction X of the entire display panel supporting member 4. Consequently, a relatively broad area of the back surface of the reflection sheet 11 can be pressed compared to the case where the length L7 in the longitudinal direction X of the area of the back surface of the reflection sheet 11 pressed by the first recessed portion 41 of the display panel supporting member 4 is less than a half of the length L5 in the longitudinal direction X of the entire display panel supporting member 4. It is thus possible to securely prevent the inner area of the reflection sheet 11 from being spaced apart backward.

In the present embodiment, as described above, the front surface of the first recessed portion 41 of the display panel supporting member 4 is arranged to press the reflection sheet 11 against the light guide plate 12. Consequently, the inner area (i.e., the shaded portion A in FIG. 9) of the front surface of the reflection sheet 11 can be prevented from being spaced apart backward from the light guide plate 112 by the first recessed portion 41.

The embodiment described herein is in all respects merely examples, and shall not be construed as limiting the present invention. The scope of the present invention is defined by the claims and not by the above-described embodiment, and includes all equivalents to the claims and modifications within the intended scope thereof.

For example, in the present application, a liquid crystal television apparatus is described as an example of the display device or television apparatus. However, the present invention is not limited to this. For example, the present application can also be applied to a display device such as a monitor of a personal computer other than a television apparatus, or to a television apparatus other than a liquid crystal television apparatus.

In the above-described embodiment, the display panel supporting member forming the rear chassis has a single first recessed portion. However, the present application is not limited to this. For example, the display panel supporting member forming the rear chassis can have two or more first recessed portions as long as the first recessed portions have a shape that is recessed toward the reflection sheet so as to press an inner area of the back surface of the reflection sheet except for the vicinity of an outer peripheral portion of the back surface of the reflection sheet.

In the above-described embodiment, the front surface of the first recessed portion of the display panel supporting member forming the rear chassis surface-contacts the inner area of the back surface of the reflection sheet except for the vicinity of the outer peripheral portion of the back surface of the reflection sheet. However, the present application is not limited to this. For example, the front surface of the first recessed portion of the display panel supporting member forming the rear chassis can point-contact or line-contact the inner area of the back surface of the reflection sheet except for the vicinity of the outer peripheral portion of the back surface of the reflection sheet.

In the above-described embodiment, the first recessed portion is formed in an area of the display panel supporting member covered by the cover member. However, the present application is not limited to this. For example, the first recessed portion can be formed in an area exposed from the cover member of the rear chassis as well as in the area covered by the cover member of the rear chassis as long as the front surface of the first recessed portion of the rear chassis can press the inner area of the back surface of the reflection sheet except for the vicinity of the outer peripheral portion of the back surface of the reflection sheet.

In the above-described. embodiment, the metal display panel supporting member and the metal heat sink are made of sheet metal (SECC). However, the present application is not limited to this. For example, a display panel supporting member or a heat sink can be made of a material such as aluminum other than sheet metal (SECC). Also, the display panel supporting member can be made of resin.

In the above-described embodiment, the first recessed portion and the second recessed portion are formed in the display panel supporting member forming the rear chassis by drawing processing. However, the present application is not limited to this. For example, the first recessed portion and the second recessed portion can be formed in the display panel supporting member forming the rear chassis by a processing method other than drawing processing.

The display device according to a first aspect of the present application includes a display panel, a light source, a reflection sheet, and a display panel supporting member. The reflection sheet reflects light emitted from the light source to the front side that is a display screen side of the reflection sheet. The display panel supporting member supports the display panel. The display panel supporting member is positioned on the back side that is an opposite side to the display screen side of the reflection sheet. A part of a back surface of the display panel supporting member on the opposite side to the display screen side forming a rear chassis. The display panel supporting member forming the rear chassis has a first recessed portion that is recessed toward the reflection sheet so as to press an inner area of the back surface of the reflection sheet except for the vicinity of an outer peripheral portion of the back surface of the reflection sheet.

In the display device according to this first aspect, as described above, the display panel supporting member forming the rear chassis has the first recessed portion that is recessed toward the reflection sheet so as to press the inner area of the back surface of the reflection sheet except for the vicinity of the outer peripheral portion of the back surface of the reflection sheet. Accordingly, the inner area of the back surface of the reflection sheet can be pressed by the first recessed portion of the rear chassis. Thus, the inner area of the reflection sheet can be prevented from being spaced apart backward, unlike in the case of pressing only the vicinity of the outer peripheral portion of the reflection sheet by an L-shaped hook provided in a front chassis, for example. Also, since the inner area of the back surface of the reflection sheet can be pressed by the first recessed portion of the display panel supporting member forming the rear chassis, it is not necessary to provide a member exclusive for pressing the reflection sheet separately.

In the display device according to the above-described first aspect, a front surface of the first recessed portion of the display panel supporting member forming the rear chassis is provided to press the inner area of the back surface of the reflection sheet except for the vicinity of the outer peripheral portion of the back surface of the reflection sheet in a state of surface-contacting the inner area of the back surface of the reflection sheet except for the vicinity of the outer peripheral portion of the back surface of the reflection sheet. With this configuration, the area of pressing the reflection sheet can be made larger compared to the case of point-contacting or line-contacting the inner area of the back surface of the reflection sheet except for the vicinity of the outer peripheral portion of the back surface of the reflection sheet, which makes it possible to securely prevent the inner area of the reflection sheet from being spaced apart backward.

In this case, the front surface of the first recessed portion of the display panel supporting member forming the rear chassis is configured such that an area corresponding to an outer edge portion of an area of the front surface of the first recessed portion that surface-contacts the back surface of the reflection sheet has a curved cross-sectional shape. With this configuration, it is possible to prevent the vicinity of the area corresponding to the outer edge portion of the area, that surface-contacts the front surface of the first recessed portion of the display panel supporting member, of the back surface of the reflection sheet from being compressed unlike in the case where the front surface of the first recessed portion of the display panel supporting member is configured such that the area corresponding to the outer edge portion of the area of the front surface of the first recessed portion that surface-contacts the back surface of the reflection sheet has an L-shaped (e.g., right angle) cross-sectional shape, for example, instead of a curved cross-sectional shape.

The display device according to the above-described first aspect further includes a heat sink provided in front of the display panel supporting member and outside the first recessed portion. The vicinity of the outer peripheral portion of the back surface of the reflection sheet is pressed by the heat sink in addition to pressing the inner area of the back surface of the reflection sheet except for the vicinity of the outer peripheral portion of the back surface of the reflection sheet by the first recessed portion of the display panel supporting member. With this configuration, both of the inner area and the outer peripheral portion of the back surface of the reflection sheet are pressed by the first recessed portion and the heat sink. Thus, the reflection sheet can more securely be pressed. Also, since the vicinity of the outer peripheral portion of the reflection sheet can be pressed by the heat sink that releases heat generated from the light source, it is not necessary to provide a member exclusive for pressing the vicinity of the outer peripheral portion of the reflection sheet separately.

The display device according to the above-described first aspect further includes a cover member provided to cover an area of the back surface of the display panel supporting member other than the part of the back surface of the display panel supporting member that forms the rear chassis. The display panel supporting member has a second recessed portion formed to surround the first recessed portion. The cover member is provided to fit into the second recessed portion of the display panel supporting member and cover the first recessed portion of the display panel supporting member. With this configuration, for example, when a board and the like are provided on the first recessed portion, the board and the like can be concealed by the cover member, Consequently, it is possible to prevent the board and the like provided on the first recessed portion from being observed by a user.

In this case, the depth of the second recessed portion of the display panel supporting member is larger than the depth of the first recessed portion of the display panel supporting member. With this configuration, the cover member can more easily be attached to the second recessed portion compared to the case where the depth of the second recessed portion of the display panel supporting member is smaller than the depth of the first recessed portion of the display panel supporting member because an inner side surface of the second recessed portion can serve as a guide when the cover member is attached to the second recessed portion.

In the display device having the above-described first recessed portion and the above-described second recessed portion, the display panel supporting member is made of sheet metal, and the first recessed portion and the second recessed portion of the display panel supporting member are formed by drawing processing. With this configuration, the first recessed portion and the second recessed portion can easily be formed in the display panel supporting member by drawing processing.

In the display device according to the above-described first aspect, the length in a longitudinal direction of the area of the back surface of the reflection sheet pressed by the first recessed portion of the display panel supporting member is equal to or greater than a half of the length in the longitudinal direction of the entire display panel supporting member. With this configuration, a relatively broad area of the back surface of the reflection sheet can be pressed compared to the case where the length in the longitudinal direction of the area of the back surface of the reflection sheet pressed by the first recessed portion of the display panel supporting member is less than a half of the length in the longitudinal direction of the entire display panel supporting member. Consequently, it is possible to securely prevent the inner area of the reflection sheet from being spaced apart backward.

The display device according to the above-described first aspect further includes a light guide plate that diffuses light emitted from the light source. The light guide plate is provided in front of the reflection sheet, and the front surface of the first recessed portion of the display panel supporting member is arranged to press the reflection sheet against the light guide plate. With this configuration, the inner area of the front surface of the reflection sheet can be prevented from being spaced apart backward from the light guide plate by the first recessed portion.

The television apparatus according to a second aspect includes a receiver, a display panel, a light source, a reflection sheet and a display panel supporting member. The receiver is capable of receiving a television broadcast. The reflection sheet reflects light emitted from the light source to the front side that is a display screen side of the reflection sheet. The display panel supporting member supports the display panel. The display panel supporting member is positioned on the back side that is an opposite side to the display screen side of the reflection sheet. A part of a back surface of the display panel supporting member on the opposite side to the display screen side forming a rear chassis. The display panel supporting member forming the rear chassis has a first recessed portion that is recessed toward the reflection sheet so as to press an inner area of the back surface of the reflection sheet except for the vicinity of an outer peripheral portion of the back surface of the reflection sheet.

In the television apparatus according to this second aspect, as described above, the display panel supporting member forming the rear chassis has the first recessed portion that is recessed toward the reflection sheet so as to press the inner area of the back surface of the reflection sheet except for the vicinity of an outer peripheral portion of the back surface of the reflection sheet. Consequently, it is possible to provide the television apparatus in which the inner area of the back surface of the reflection sheet can be pressed by the first recessed portion of the rear chassis. Thus, it is possible to prevent the inner area of the reflection sheet from being spaced apart backward, unlike in the case of pressing only the vicinity of the outer peripheral portion of the reflection sheet by an shaped hook provided in a front chassis, for example. Also, since the inner area of the back surface of the reflection sheet can be pressed by the first recessed portion of the display panel supporting member forming the rear chassis, it is not necessary to provide a member exclusive for pressing the reflection sheet separately.

As described above, with the display device and the television apparatus, the inner area of the reflection sheet can be prevented from being spaced apart backward.

Second Embodiment

Referring now to FIGS. 11 through 26, a liquid crystal television apparatus 200 in accordance with a second embodiment will now be explained. In view of the similarity between the first and second embodiments, the parts of the second embodiment that are identical to the parts of the first embodiment or are functionally identical (but not exactly identical) to the parts of the first embodiment will be given the same reference numerals as the parts of the first embodiment. Moreover, the descriptions of the parts of the second embodiment that are identical to the parts of the first embodiment may be omitted for the sake of brevity, The liquid crystal television apparatus 200 is an example of the "display device" and the "television apparatus."

With the conventional display device described in Patent Citation 2, the reflection sheet abutting portion is formed by drawing processing. Generally, in a case of conducting drawing processing to a metal plate, a boundary portion of the portion to which drawing processing has been conducted with respect to the portion where the reflection sheet abutting portion and the reflection sheet abut each other (i.e., a base of the portion to which drawing processing has been conducted) has a curvature radius R which is equal to the thickness of the metal plate. When the curvature radius R of the boundary portion of the portion to which drawing processing has been conducted is small, there are cases where the boundary portion of the portion to which drawing processing has been conducted (i.e., the reflection sheet abutting portion) will have a shape raised toward the reflection sheet. Accordingly, the raised portion of the reflection sheet abutting portion compresses the reflection sheet and thus compresses the light guide plate, which causes a problem that a white spot will occur on a display screen corresponding to the compressed portion of the light guide plate.

The liquid crystal television apparatus 200 is made to address the above-described circumstances. With the liquid crystal television apparatus 200, a white spot is prevented from occurring on a display screen due to compression of the light guide plate.

Figure 11:
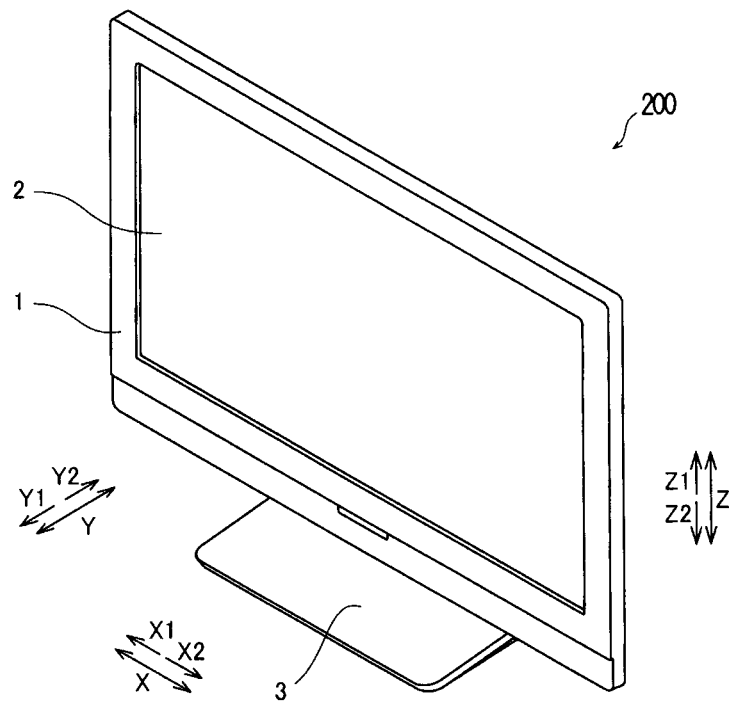
FIG. 11 is a front perspective view of a liquid crystal television apparatus in accordance with a second embodiment.
Figure 12:
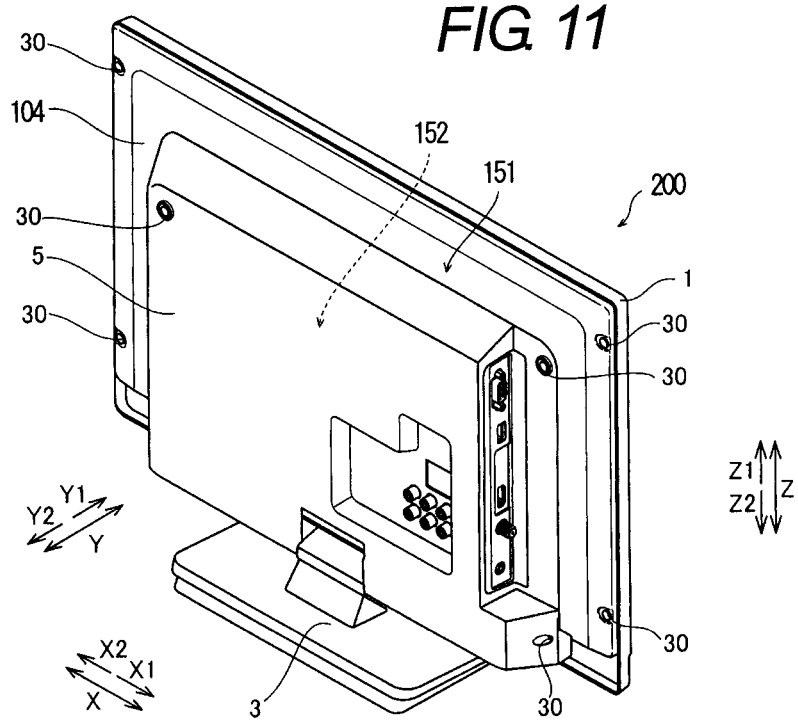
FIG. 12 is a rear perspective view of the liquid crystal television apparatus illustrated in FIG. 11.
Figure 13:
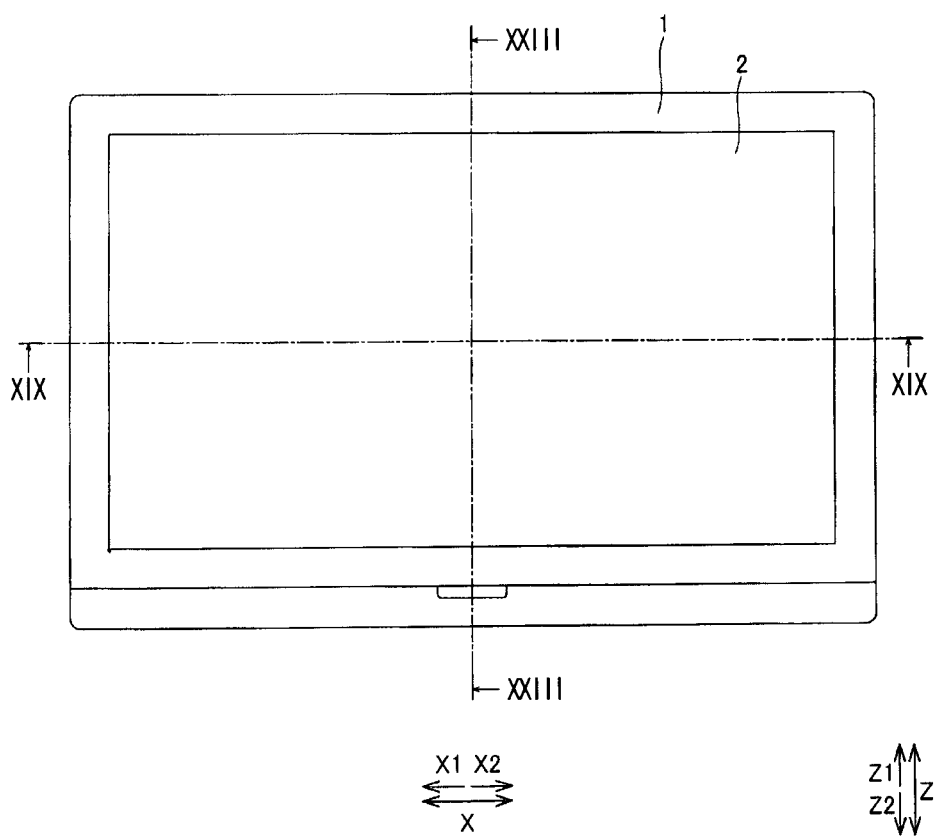
FIG. 13 is a front elevational view of a front chassis and a liquid crystal display panel of the liquid crystal television apparatus illustrated in FIG. 11.

As shown in FIGS. 11 through 13, the liquid crystal television apparatus 200 has a rectangular shape. The liquid crystal television apparatus 200 has a frame-shaped front chassis 1, a liquid crystal display panel 2 housed in the front chassis 1, and a stand member 3 that supports the liquid crystal television apparatus 200 as a whole. The front chassis 1 and the stand member 3 are both made of resin.

Figure 14:
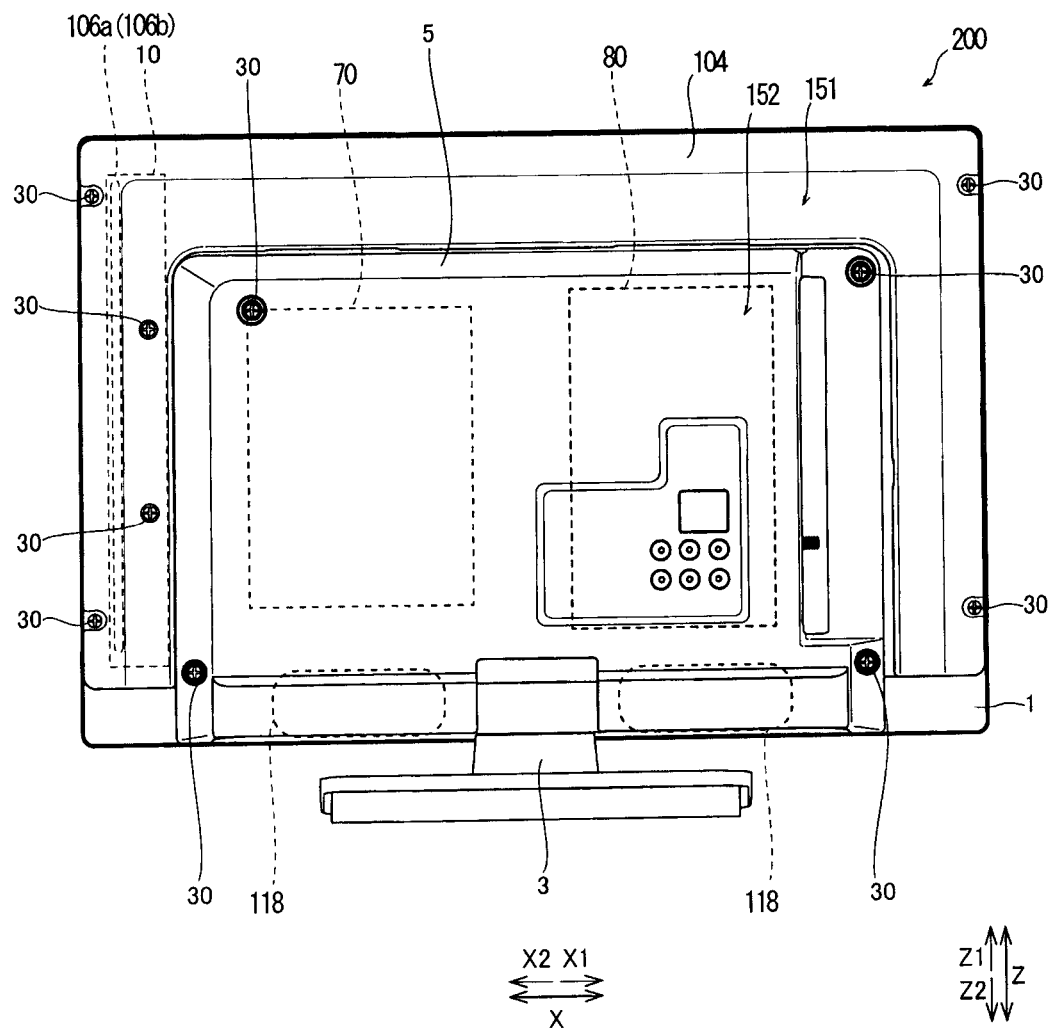
FIG. 14 is a rear elevational view of the liquid crystal television apparatus illustrated in FIG. 11.

As shown in FIG. 12 and FIG. 14, the liquid crystal television apparatus 200 further has a panel supporting member 104. The panel supporting member 104 is made of sheet metal, such as SECC (steel electrolytic cold commercial or electrolytic zinc-coated steel sheet). The panel supporting member 104 is provided on a back surface side of the front chassis 1 (i.e., on the arrow Y2 side). As shown in FIG. 14, the panel supporting member 104 has a rectangular shape as viewed from the back. The panel supporting member 104 is one example of the "supporting member."

The liquid crystal television apparatus 200 has a cover member 5. The cover member 5 is made of resin, and is attached to a back surface or rear surface of the metal panel supporting member 104. The cover member 5 has a rectangular shape as viewed from the back, and is formed to be smaller than the front chassis 1 and the panel supporting member 104.

Also, the cover member 5 covers the back surface of the panel supporting member 104 such that the vicinity of the outer peripheral portion of the back surface of the panel supporting member 104 is exposed in an inverted U shape viewed from the back. The rear chassis is constructed of an area 151 of the back surface of the panel supporting member 104 exposed outside, and the cover member 5. The area 151 of the panel supporting member 104 exposed outside is configured to serve as a heat releasing portion that releases heat generated from an LED light source 106a and a heat generating element 81 (see FIG. 15) of a circuit board 80 outside. The LED light source 106a is one example of the "light source."

Figure 15:
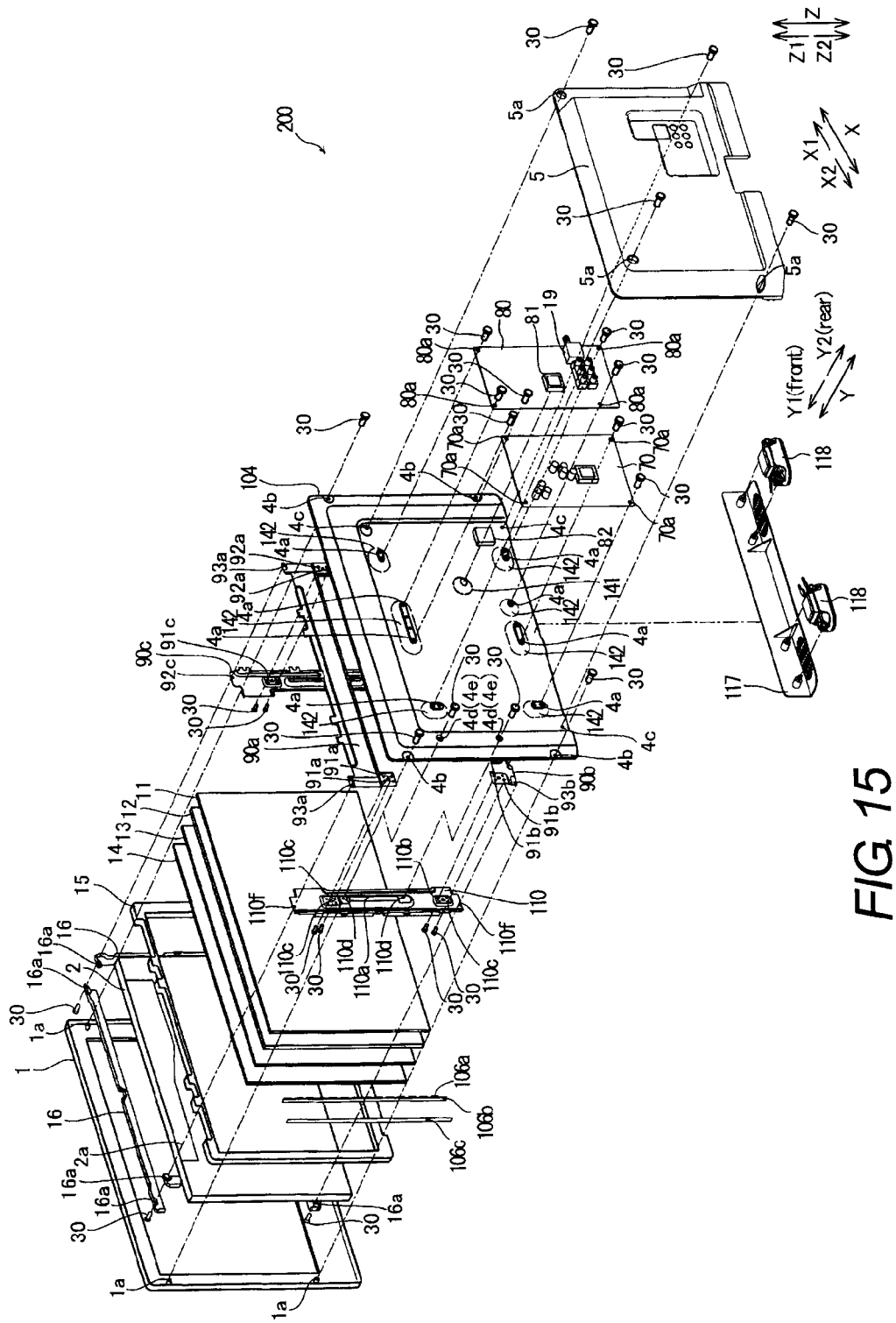
FIG. 15 is an exploded perspective view of the liquid crystal television apparatus illustrated in FIG. 11.

As shown in FIG. 14 and FIG. 15, the liquid crystal television apparatus 200 further has circuit boards 70 and 80. The circuit board 70 has the function of supplying power to the apparatus as a whole, while the circuit board 80 has the function for signal processing. The circuit boards 70 and 80 are attached to an area 152 to which the cover member 5 of the back surface of the panel supporting member 104 is attached in an arrangement spaced apart from each other at a predetermined distance in the longitudinal direction X. The heat generating element 81, such as an IC that generates heat in a normal use condition, is attached to the circuit board 80.

The panel supporting member 104 has a thermal pad attachment portion 141 that projects toward the inner surface of the cover member 5. The thermal pad attachment portion 141 is formed in an area of the back surface (i.e., the surface on the arrow Y2 side) of the panel supporting member 104 corresponding to the heat generating element 81 of the circuit board 80. A thermal pad 82 is provided between the thermal pad attachment portion 141 of the panel supporting member 104 and the heat generating element 81 of the circuit board 80. Thus, the heat generated from the heat generating element 81 is released toward the panel supporting member 104. The thermal pad 82 is made of a mixed material of silicone polymer and ceramics.

Figure 17:
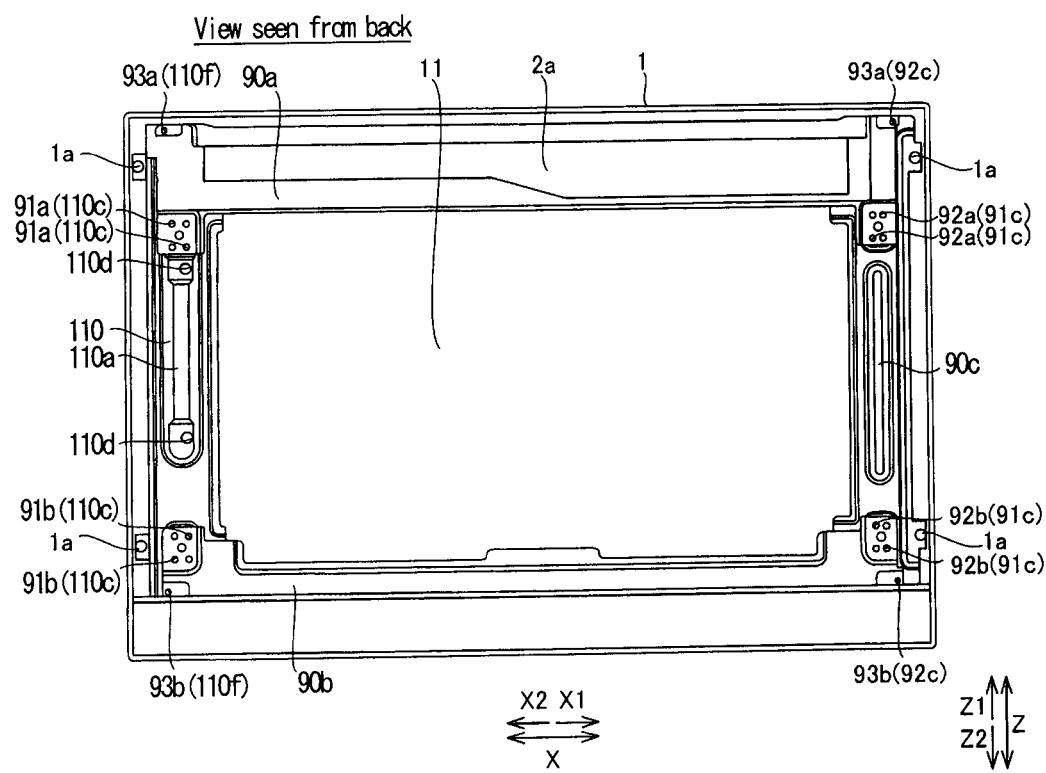
FIG. 17 is a rear elevational view of a heat sink, a reflection sheet, and a reflection sheet holder of the liquid crystal television apparatus illustrated in FIG. 11.
Figure 18:
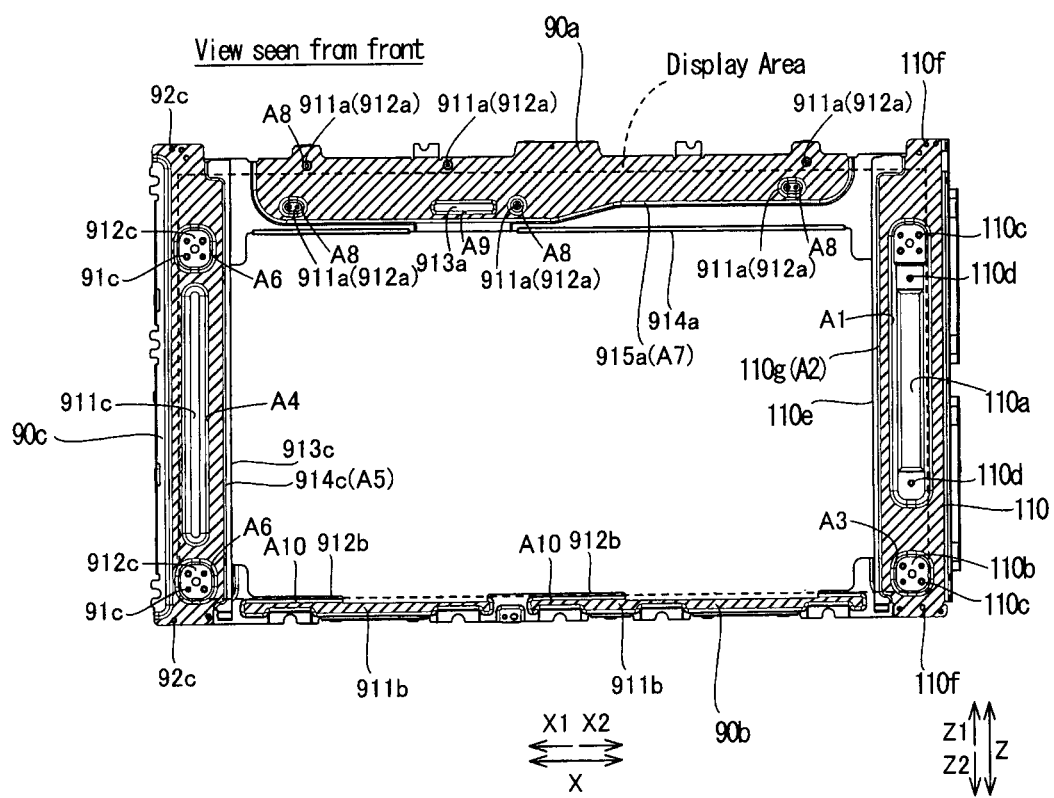
FIG. 18 is a front elevational view of the heat sink and the reflection sheet holder of the liquid crystal television apparatus illustrated in FIG. 11.
Figure 19:
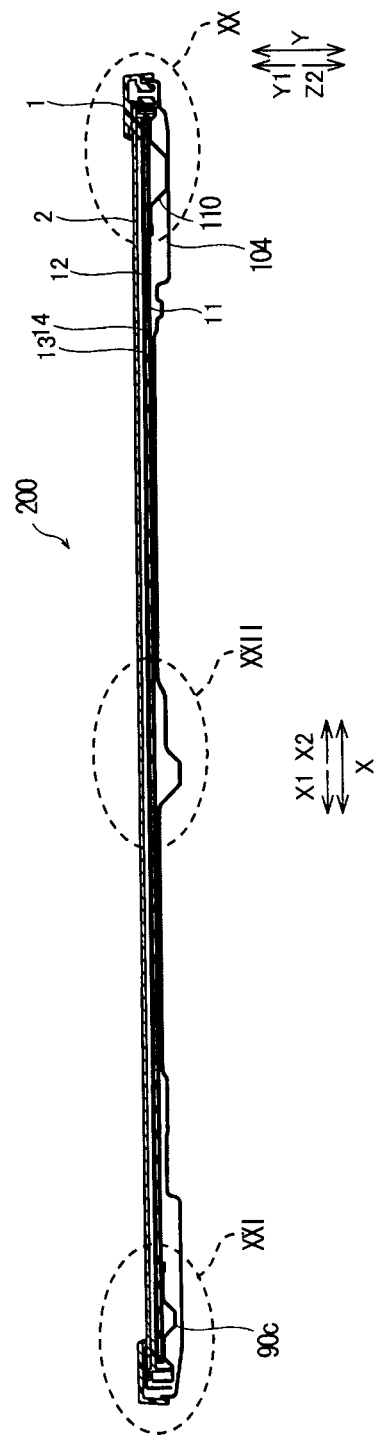
FIG. 19 is a cross sectional view of the liquid crystal television apparatus taken along XIX-XIX line in FIG. 13.

As shown in FIG. 15, FIG. 17 and FIG. 18, the liquid crystal television apparatus 200 further has a plurality of (three in this embodiment) reflection sheet holders 90a, 90b and 90c, and a heat sink 110. The reflection sheet holders 90a, 90b and 90c and the heat sink 110 are made of sheet metal (SECC). The reflection sheet holders 90a, 90b and 90c and the heat sink 110 are arranged in front of the panel supporting member 104 (i.e., on the arrow Y1 side). Furthermore, the liquid crystal television apparatus 200 further has a reflection sheet 11, a light guide plate 12, a light diffusing sheet 13, a lens sheet 14, a frame-shaped resin frame 15, and a plurality of (four in this embodiment) bezels 16. The reflection sheet 11, the light guide plate 12, the light diffusing sheet 13, the lens sheet 14, the frame-shaped resin frame 15, the liquid crystal display panel 2 to which a liquid crystal panel driving board 2a that drives the liquid crystal display panel 2 is attached, and the bezels 16 are arranged in front of the reflection sheet holders 90a, 90b and 90c, and the heat sink 110 (i.e., on the arrow Y1 side). The heat sink 110 is one example of the "reflection sheet holding member" and the "reflection sheet holding portion." The reflection sheet holders 90a, 90b and 90c are examples of the "reflection sheet holding member" and the "reflection sheet holding portion." The liquid crystal display panel 2 is one example of the "display panel."

Here, in this embodiment, as shown in FIGS. 17 and 18, the reflection sheet holders 90a, 90b and 90c, and the heat sink 110 are provided along four sides (i.e., the sides in the arrow Z1 direction, the arrow Z2 direction, the arrow X1 direction, and the arrow X2 direction) of the display area (i.e., the dashed line of FIG. 18) of the liquid crystal display panel 2. As described below, the reflection sheet holders 90a and 90b are fixed to the heat sink 110 by a plurality of screws 30. Also, the reflection sheet holders 90a and 90b are fixed to the reflection sheet holder 90c by a plurality of screws 30. Thus, the reflection sheet holders 90a, 90b and 90c, and the heat sink 110 are provided in a frame shape with being fixed by the screws 30. Four sides of the reflection sheet 11 are pressed toward the light guide plate 12 by the reflection sheet holders 90a, 90b and 90c, and the heat sink 110. More specifically, the reflection sheet holders 90a, 90b and 90c, and the heat sink 110 supports the reflection sheet 11. In particular, the reflection sheet holders 90a, 90b and 90c, and the heat sink 110 contacts with the reflection sheet 11 in a frame shape (i.e., at the shaded area of FIG. 18) on the outer peripheral portion side (e.g., the vicinity of the outer peripheral portion) of the display area of the liquid crystal display panel 2 without contacting with the reflection sheet 11 at the central portion of the display area. In other words, the reflection sheet holders 90a, 90h and 90c, and the heat sink 110 contacts with the reflection sheet 11 in a frame shape area that corresponds to the vicinity of the outer peripheral portion of the display area (or outward of the outer peripheral portion of the display area) of the liquid crystal display panel 2 from the back side of the liquid crystal television apparatus 200.

As shown in FIG. 18, the heat sink 110 has first and second drawn portions 110a and 110b formed by drawing processing to be projected toward the panel supporting member 104. The first drawn portion 110a is provided to bring the heat sink 110 and the panel supporting member 104 into surface-contact (see FIG. 20) with each other. A portion of the first drawn portion 110a where a plurality of screw insertion holes 110c described below are formed (i.e., a portion on the arrow Z1 side) is provided to bring the heat sink 110 and the reflection sheet holder 90a into surface-contact with each other. The second drawn portion 110b is provided to bring the heat sink 110 and the reflection sheet holder 90b into surface-contact with each other. The first drawn portion 110a is formed to have a substantially elongated shape in a plane view. The second drawn portion 110b is formed to have a substantially round shape in a plane view. The screw insertion holes 110c for attaching the reflection sheet holder 90a are formed in the first drawn portion 110a. Screw insertion holes 110d for attaching the panel supporting member 104 are also formed in the first drawn portion 110a. Screw insertion holes 110e for attaching the reflection sheet holder 90b are formed in the second drawn portion 110b. The first drawn portion 110a and the second drawn portion 110b are examples of the "drawn portion."

Figure 20:
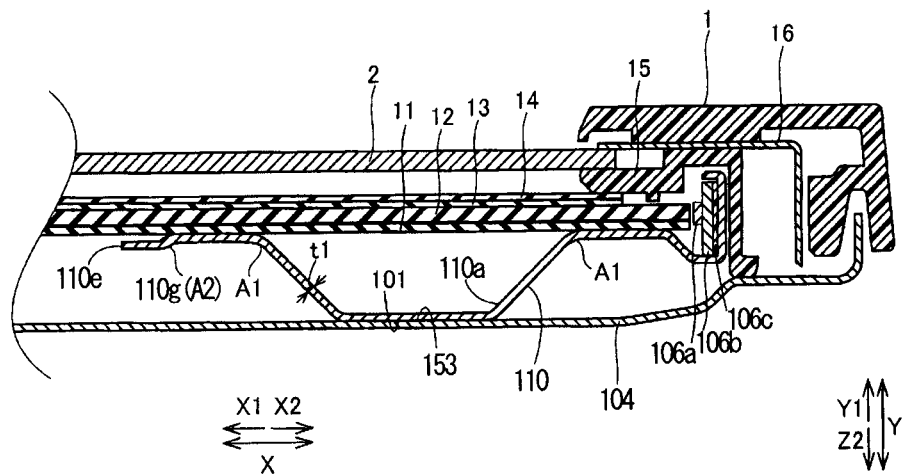
FIG. 20 is an enlarged partial cross sectional view of an encircled portion XX of the liquid crystal television apparatus illustrated in FIG. 19.

In this embodiment, the drawing processing is conducted such that the first drawn portion 110a is drawn relative to a contact portion where the reflection sheet 11 and the heat sink 110 contact with each other. The contact portion and the first drawn portion 110a define a boundary portion A1 therebetween. Here, in this embodiment, as shown in FIG. 20, the drawing processing is conducted such that the boundary portion A1 of the first drawn portion 110a with respect to the contact portion where the reflection sheet 11 and the heat sink 110 abut each other (i.e., abuse of the first drawn portion 110a on the reflection sheet 11 side or an outer peripheral portion of the first drawn portion 110a having a substantially elongated shape in a plane view, see FIG. 18) has a radius of curvature (R) larger than a thickness t1 of the sheet metal forming the heat sink 110. Specifically, the boundary portion A1 of the first drawn portion 110a with respect to the contact portion where the reflection sheet 11 and the heat sink 110 abut each other is configured to have the radius of curvature that is three times (i.e., 3×t1) or more and six times (i.e., 6×t1) or less of the thickness t1 of the sheet metal forming the heat sink 110. More specifically, the thickness t1 of the sheet metal forming the heat sink 110 is 0.6 mm, and the radius of curvature (R) of the boundary portion A1 of the first drawn portion 110a is 1.8 mm (i.e., 3×t1) or more and 3.6 mm (i.e., 6×t1) or less. As best shown in FIG. 20, an outer edge portion 110e (e.g., inner edge portion) of the heat sink 110 on the center side (i.e., on the arrow X1 side) of the display area is spaced apart from the reflection sheet 11 without contacting the reflection sheet 11. A portion (e.g., a third drawn portion 110g) between the outer edge portion 110e of the heat sink 110 on the center side of the display area and the first drawn portion 110a is also formed by drawing processing. In this embodiment, the drawing processing is conducted such that the third drawn portion 110g is drawn relative to a contact portion where the reflection sheet 11 and the heat sink 110 contact with each other. The contact portion and the third drawn portion 110g define a boundary portion A2 therebetween. The drawing processing is conducted such that the boundary portion A2 of the third drawn portion 110g with respect to the contact portion where the reflection sheet 11 and the heat sink 110 abut each other (i.e., a base of the third drawn portion 110g) has a radius of curvature (R) larger than the thickness t1 (e.g., 0.6 min) of the sheet metal forming the heat sink 110. In particular, the radius of curvature of the boundary portion A2 is three times (i.e., 3×t1 (e.g., 1.8 mm)) or more and six times (i.e., 6×t1 (e.g., 3.6 mm)) or less of the thickness t1 of the sheet metal forming the heat sink 110. Further, in this embodiment, the drawing processing is conducted such that the second drawn portion 110b is drawn relative to a contact portion where the reflection sheet 11 and the heat sink 110 contact with each other. The contact portion and the second drawn portion 110b define a boundary portion A3 therebetween. The drawing processing is conducted such that the boundary portion A3 of the second drawn portion 110b with respect to the contact portion where the reflection sheet lit and the heat sink 110 abut each other (i.e., a base of the second drawn portion 110b on the reflection sheet 11 side, or an outer peripheral portion of the second drawn portion 110b having a substantially round shape, see FIG. 18) has a radius of curvature (R) larger than the thickness t1 (e.g., 0.6 mm) of the sheet metal forming the heat sink 110. In particular, the radius of curvature of the boundary portion A3 is three times (i.e., 3×t1 (e.g., 1.8 mm)) or more and six times (i.e., 6×t1 R (e.g., 3.6 mm)) or less of the thickness t1 of the sheet metal forming the heat sink 110. As shown in FIG. 18, screw insertion holes 110f for attaching the bezels 16 are formed in the upper end portion and the lower end portion of the heat sink 110, respectively. The third drawn portion 110g is one example of the "drawn portion."

As shown in FIG. 20, an outer surface 101 of the first drawn portion 110a. of the heat sink 110 is formed to have a flat surface shape, and is provided to surface-contact an inner surface 153 of the panel supporting member 104. Also, the heat generated from the LED light source 106a is released from the area 151 of the panel supporting member 104 exposed outside through the heat sink 110.

As shown in FIG. 18, the reflection sheet holder 90c has a first drawn portion 911c and two second drawn portions 912c formed by drawing processing to be projected toward the panel supporting member 104. The first drawn portion 911c is provided to increase the mechanical strength of the reflection sheet holder 90c. The second drawn portion 912c on the arrow Z1 side is provided to bring the reflection sheet holder 90c and the reflection sheet holder 90a into surface-contact with each other. The second drawn portion 912c on the arrow Z2 side is provided to bring the reflection sheet holder 90c and the reflection sheet holder 90b into surface-contact with each other. The first drawn portion 911c is formed to have a substantially elongated shape in a plane view. The second drawn portions 912c are formed to have a substantially round shape in a plane view. Screw insertion holes 91c for attaching the reflection sheet holder 90a and the reflection sheet holder 90b are formed in the second drawn portions 912c. Screw insertion holes 92c for attaching the bezels 16 are formed in the upper end portion and the tower end portion of the reflection sheet holder 90c, respectively. The first drawn portion 911c and the second drawn portions 912c are examples of the "drawn portion."

Figure 21:
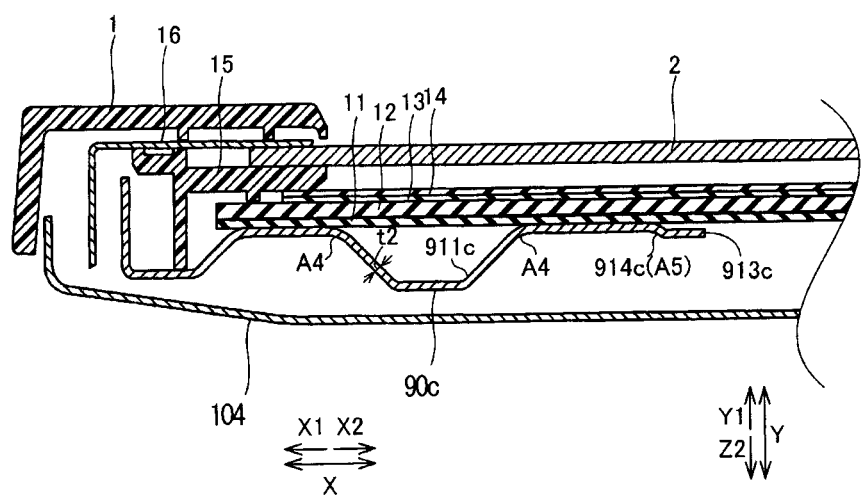
FIG. 21 is an enlarged partial cross sectional view of an encircled portion XXI of the liquid crystal television apparatus illustrated in FIG. 19.
Figure 22:
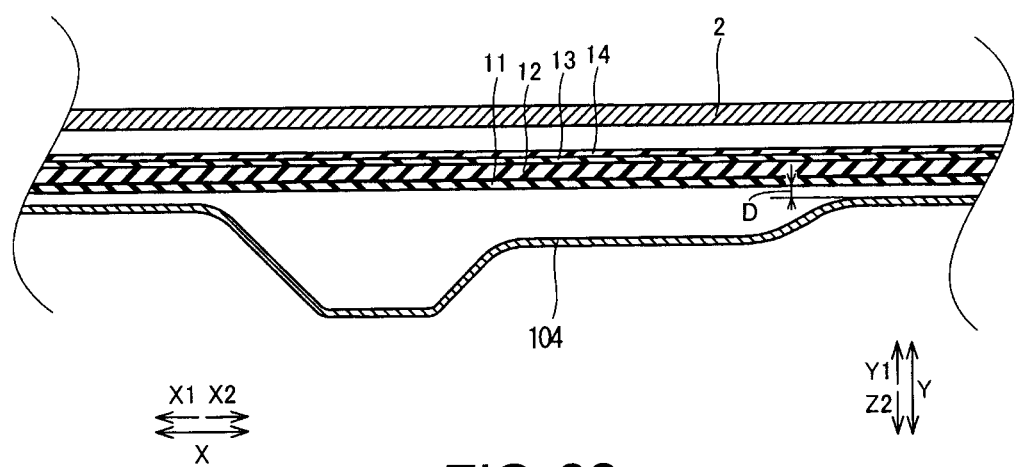
FIG. 22 is an enlarged partial cross sectional view of an encircled portion XXII of the liquid crystal television apparatus illustrated in FIG. 19.
Figure 23:
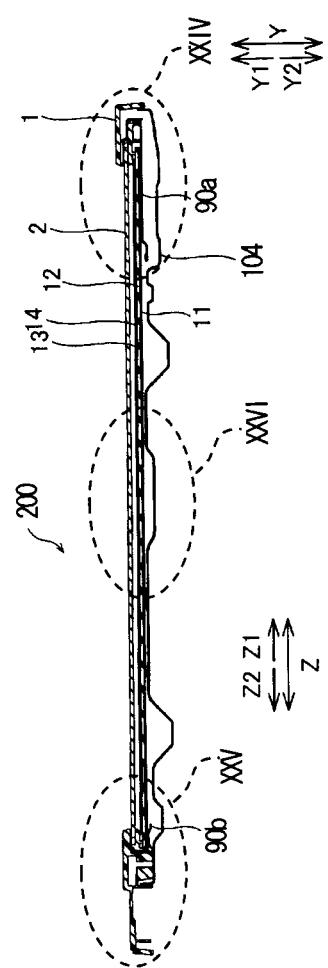
FIG. 23 is a cross sectional view of the liquid crystal television apparatus taken along XXIII-XXIII line in FIG. 13.

In this embodiment, the drawing processing is conducted such that the first drawn portion 911c is drawn relative to a contact portion where the reflection sheet 11 and the reflection sheet holder 90c contact with each other. The contact portion and the first drawn portion 911c define a boundary portion A4 therebetween. Here, in this embodiment, as shown in FIG. 21, the drawing processing is conducted such that the boundary portion A4 of the first drawn portion 911c with respect to the contact portion where the reflection sheet 11 and the reflection sheet holder 90c abut each other (i.e., a base of the first drawn portion 911c on the reflection sheet 11 side, or an outer peripheral portion of the first drawn portion 911c having a substantially elongated shape in a plane view, see FIG. 18) has a radius of curvature larger than a thickness t2 (e.g., 0.6 mm) of the sheet metal forming the reflection sheet holder 90c. In particular, the radius of curvature of the boundary portion A4 is three times (i.e., 3×t2 (e.g., 1.8 mm)) or more and six times (i.e., 6×t2 R (e.g., 3.6 mm)) or less of the thickness t2 of the sheet metal forming the reflection sheet holder 90c. As shown in FIG. 21, an outer edge portion 913c (e.g., an inner edge portion) of the reflection sheet holder 90c on the center side of the display area is spaced apart from the reflection sheet 11 without contacting the reflection sheet 11. A portion (e.g., third drawn portion 914c) between the outer edge portion 913c of the reflection sheet holder 90c on the center side of the display area and the first drawn portion 911c is also formed by drawing processing. The drawing processing is conducted such that the third drawn portion 914c is drawn relative to a contact portion where the reflection sheet 11 and the reflection sheet holder 90c contact with each other. The contact portion and the third drawn portion 914c define a boundary portion A5 therebetween. The drawing processing is conducted such that the boundary portion A5 of the third drawn portion 914c with respect to the contact portion where the reflection sheet 11 and the reflection sheet holder 90c abut each other (i.e., a base of the third drawn portion 914c) has a radius of curvature larger than the thickness t2 (e.g., 0.6 mm) of the sheet metal forming the reflection sheet holder 90c. In particular, the radius of curvature of the boundary portion AS is three times (i.e., 3×t2 (e.g., 1.8 mm)) or more and six times (i.e., 6×t2 R (e.g., 3.6 mm)) or less of the thickness t2 of the sheet metal forming the reflection sheet holder 90c. Further, in this embodiment, the drawing processing is conducted such that the second drawn portion 912c is drawn relative to a contact portion where the reflection sheet 11 and the reflection sheet holder 90c contact with each other. The contact portion and the second drawn portion 912c define a boundary portion A6 therebetween. The drawing processing is conducted such that boundary portions A6 of the second drawn portions 912c with respect to the contact portion where the reflection sheet 11 and the reflection sheet holder 90c abut each other (i.e., bases of the second drawing portions 912c on the reflection sheet 11 side, or outer peripheral portions of the second drawing portions 912c having a substantially round shape, see FIG. 18) has a radius of curvature larger than the thickness t2 of the sheet metal forming the reflection sheet holder 90c (e.g., three times or more and six times or less of the thickness t2). The third drawn portion 914c is one example of the "drawn portion."

As shown in FIG. 18, the reflection sheet holder 90a has a plurality of first drawn portions 911a formed by drawing processing to be projected toward the panel supporting member 104. The first drawn portions 911a are provided to bring the reflection sheet holder 90a and the liquid crystal panel driving board 2a into surface-contact with each other. Screw insertion holes 912a for fixing the liquid crystal panel driving board 2a are formed in the first drawn portions 911a. A second drawn portion 913a is provided in the reflection sheet holder 90a to increase the mechanical strength of the reflection sheet holder 90a. The first drawn portions 911a and the second drawn portion 913a are examples of the "drawn portion."

Figure 24:
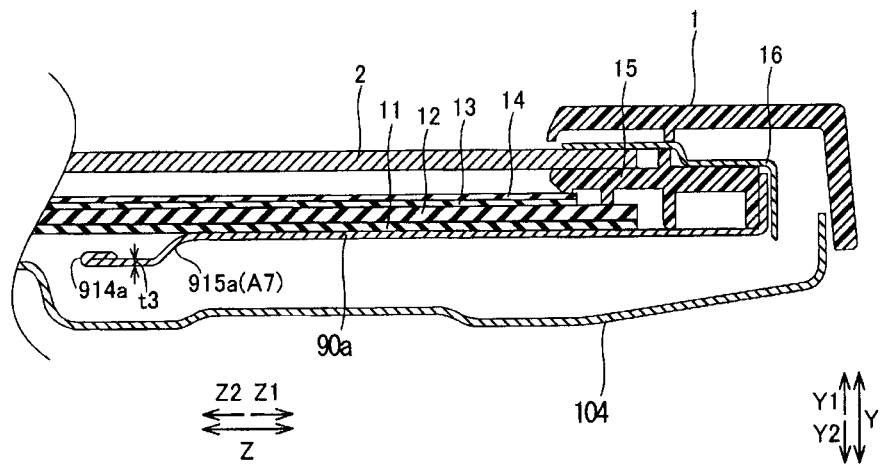
FIG. 24 is an enlarged partial cross sectional view of an encircled portion XXIV of the liquid crystal television apparatus illustrated in FIG. 23.

Here, in this embodiment, as shown in FIG. 24, an outer edge portion 914a (e.g., inner edge portion) of the reflection sheet holder 90a on the center side of the display area is spaced apart from the reflection sheet 11 without contacting the reflection sheet 11. A portion (e.g., a third drawn portion 915a) between the outer edge portion 914a of the reflection sheet holder 90a on the center side of the display area and a portion where the reflection sheet holder 90a and the reflection sheet 11 abut each other is also formed by drawing processing. The drawing processing is conducted such that the third drawn portion 915a is drawn relative to a contact portion where the reflection sheet 11 and the reflection sheet holder 90a contact with each other. The contact portion and the third drawn portion 915a define a boundary portion A7 therebetween. The drawing processing is conducted such that the boundary portion A7 of the third drawn portion 915a with respect to the contact portion where the reflection sheet 11 and the reflection sheet holder 90a abut each other (i.e., a base of the third drawn portion 915a) has a radius of curvature larger than a thickness t3 (e.g., 0.6 mm) of the sheet metal forming the reflection sheet holder 90a. In particular, the radius of curvature of the boundary portion A7 is three times (i.e., 3×t3 (e.g., 1.8 mm)) or more and six times (i.e., 6×t3 R (e.g., 3.6 mm)) or less of the thickness t3 of the sheet metal forming the reflection sheet holder 90a. Further, in this embodiment, the drawing processing is conducted such that the first drawn portions 911a are drawn relative to a contact portion where the reflection sheet 11 and the reflection sheet holder 90a contact with each other. The contact portion and the first drawn portions 911a define boundary portions A8 therebetween. Furthermore, the drawing processing is conducted such that the second drawn portions 913a are drawn relative to a contact portion where the reflection sheet 11 and the reflection sheet holder 90a contact with each other. The contact portion and the second drawn portions 913a define a boundary portions A9 therebetween. In particular, the drawing processing is conducted such that the boundary portions A8 of the first drawn portions 911a with respect to the contact portion where the reflection sheet 11 and the reflection sheet holder 90a abut each other (i.e., bases of the first drawn portions 911a on the reflection sheet 11 side, or outer peripheral portions of the first drawn portions 911a, see FIG. 18), and the boundary portion A9 of the second drawn portion 913a with respect to the contact portion where the reflection sheet 11 and the reflection sheet holder 90a abut each other (i.e., a base of the second drawn portion 913a on the reflection sheet 11 side, or an outer peripheral portion of the second drawn portion 913a, see FIG. 18) have a radius of curvature larger than the thickness t3 of the sheet metal forming the reflection sheet holder 90a (e.g., three times or more and six times or less of the thickness t3). The third drawn portion 915a is one example of the "drawn portion."

Figure 25:
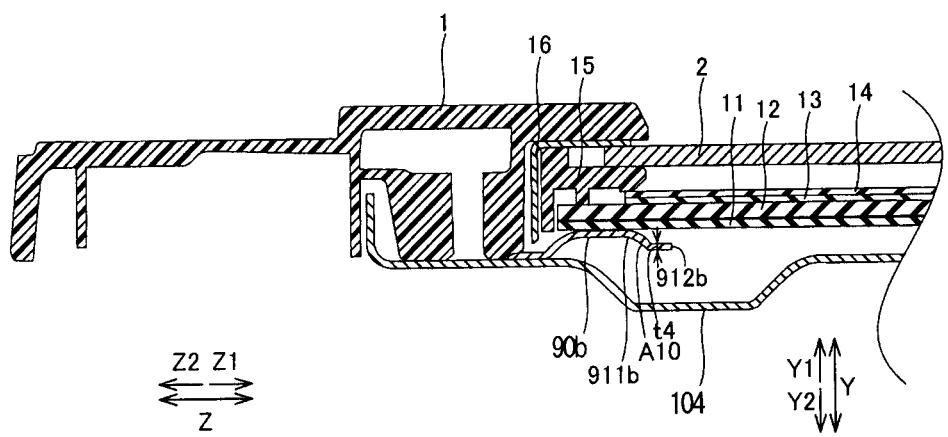
FIG. 25 is an enlarged partial cross sectional view of an encircled portion XXV of the liquid crystal television apparatus illustrated in FIG. 23.
Figure 26:
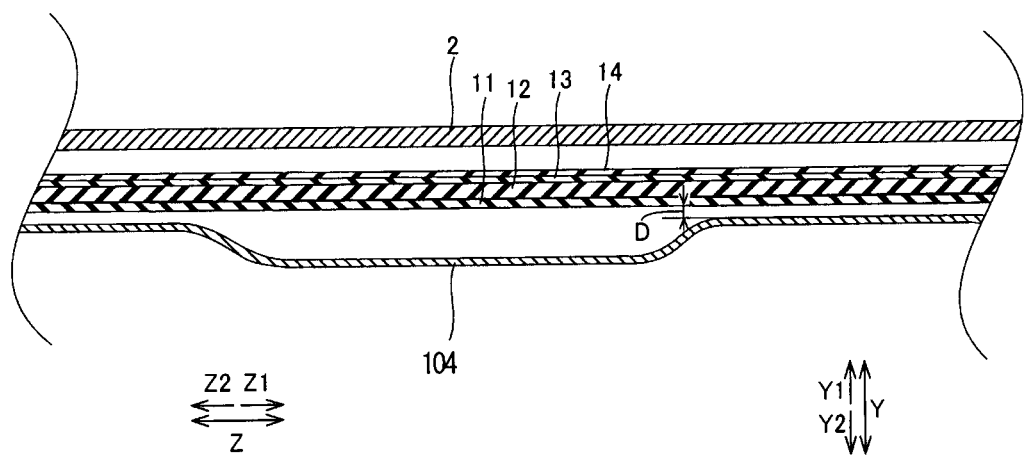
FIG. 26 is an enlarged partial cross sectional view of an encircled portion XXVI of the liquid crystal television apparatus illustrated in FIG. 23.

As shown in FIG. 18, the reflection sheet holder 90b has two drawn portions 911b formed by drawing processing. The drawn portions 911b are provided to bring the reflection sheet holder 90b and the reflection sheet 11 into surface-contact with each other. Here, in this embodiment, the drawing processing is conducted such that the drawn portions 911b are drawn relative to a contact portion where the reflection sheet 11 and the reflection sheet holder 90b contact with each other. The contact portion and the drawn portions 911b define boundary portions A10 therebetween. The drawing processing is conducted such that the boundary portions A10 of the drawn portions 911b with respect to the contact portion where the reflection sheet 11 and the reflection sheet holder 90b abut each other (i.e., bases of the drawn portions 911b) has a radius of curvature larger than a thickness t4 (e.g., 0.6 mm) of the sheet metal forming the reflection sheet holder 90b. In particular, the radius of curvature of the boundary portion A10 is three times (i.e., 3×t4 (e.g., 1.8 mm)) or more and six times (i.e., 6×t4 R (e.g., 3.6 mm)) or less of the thickness t4 of the sheet metal forming the reflection sheet holder 90b. As shown in FIG. 25, outer edge portions 912b (e.g., inner edge portions) of the drawn portions 911b of the reflection sheet holder 90b on the center side of the display area are spaced apart from the reflection sheet 11 without contacting the reflection sheet 11.

As shown in FIG. 17, a plurality of heat sink attachment threaded holes 91a and a plurality of heat sink attachment threaded holes 91b for attaching the heat sink 110 are formed at the left ends of the reflection sheet holder 90a and the reflection sheet holder 90b, respectively. Furthermore, a plurality of reflection sheet holder attachment threaded holes 92a and a plurality of reflection sheet holder attachment threaded holes 92b for attaching the reflection sheet holder 90c are formed at the right ends of the reflection sheet holder 90a and the reflection sheet holder 90b, respectively. The heat sink 110, the reflection sheet holder 90a, and the reflection sheet holder 90b are fixed by fastening the screws 30 (see FIG. 15) into the heat sink attachment threaded holes 91a of the reflection sheet holder 90a and the heat sink attachment threaded holes 91b of the reflection sheet holder 90b through the screw insertion holes 110c of the heat sink 110. The reflection sheet holder 90a, the reflection sheet holder 90b, and the reflection sheet holder 90c are fixed by fastening the screws 30 into the reflection sheet holder attachment threaded holes 92a of the reflection sheet holder 90a and the reflection sheet holder attachment threaded holes 92b of the reflection sheet holder 90b through the screw insertion holes 91c of the reflection sheet holder 90c.

The bezels 16, the heat sink 110, the reflection sheet holder 90a, and the reflection sheet holder 90b are fixed by fastening the screws 30 into bezel attachment threaded holes 93a and 93b formed at the left ends of the reflection sheet holders 90a and 90b, respectively, through screw insertion holes 16a of the bezels 16 and the screw insertion holes 110f of the heat sink 110. The bezels 16, the reflection sheet holder 90a, the reflection sheet holder 90b, and the reflection sheet holder 90c are fixed by fastening the screws 30 into a bezel attachment threaded hole 93a formed at the right end of the reflection sheet holder 90a through the screw insertion hole 16a of the bezels 16 and the screw insertion hole 92c in the upper end portion of the reflection sheet holder 90c, and by fastening the screws 30 into a bezel attachment threaded hole 93b formed at the right end of the reflection sheet holder 90b through the screw insertion hole 16a of the bezels 16 and the screw insertion hole 92c in the lower end portion of the reflection sheet holder 90c.

As shown in FIG. 17, the liquid crystal panel driving board 2a that drives the liquid crystal display panel 2 is attached to the back surface of the reflection sheet holder 90a provided in the vicinity of the side of the front chassis 1 on the arrow Z1 side.

As shown in FIG. 20, the LED light source 106a for a back light with a plurality of LEDs is provided on the side of the light guide plate 12, The LED light source 106a generates heat in a normal use condition of the liquid crystal television apparatus 200. Also, the LED light source 106a is attached to a surface of an LED board 106b on the arrow X1 side. A surface of the LED board 106b on the arrow X2 side (i.e., the opposite surface of the surface to which the LED light source 106a is attached) is attached to a surface of the heat sink 110 on the arrow X1 side trough a heat release tape or sheet 106c.

Here, in this embodiment, as shown in FIG. 19 through FIG. 26, the panel supporting member 104 is provided at a predetermined distance from the reflection sheet 11 without contacting the reflection sheet 11 in an area corresponding to the display area (i.e., the dashed line in FIG. 18). Specifically, the panel supporting member 104 is provided at a distance D (see FIG. 22 and FIG. 26) of 1 mm or more and 2 mm or less from the reflection sheet 11 in the area corresponding to the display area where the panel supporting member 104 and the reflection sheet 11 are closest to each other. The reflection sheet 11 can be prevented from warping by providing the panel supporting member 104 at the distance D of 1 mm or more and 2 mm or less from the reflection sheet 11 in the area where the panel supporting member 104 and the reflection sheet 11 are closest to each other.

As shown in FIG. 15, a plurality of board attachment portions 142 to which the circuit board 70 and the circuit board 80 are attached, respectively, are formed in the back surface (or bottom surface) of the panel supporting member 104. Each of the board attachment portions 142 is formed to be projected toward the cover member 5. A plurality of screw insertion holes 70a for inserting screws 30 are formed in the outer edge portion of the circuit board 70. The circuit board 70 is fixed to the panel supporting member 104 by fastening the screws 30 into a plurality of board attachment threaded holes 4a of the panel supporting member 104 through the screw insertion holes 70a of the circuit board 70.

A plurality of screw insertion holes 80a for inserting the screw 30 are formed in the outer edge portion of the circuit board 80. The circuit board 80 is fixed to the panel supporting member 104 by fastening the screws 30 into the board attachment threaded holes 4a of the panel supporting member 104 through the screw insertion holes 80a of the circuit board 80.

A plurality of screw insertion holes 4b for inserting the screw 30 are formed in the back surface of the panel supporting member 104 along the outer edge portion thereof. The panel supporting member 104 is fixed to the front chassis 1 by fastening the screws 30 into a plurality of rear chassis attachment threaded holes 1a of the front chassis 1 through the screw insertion holes 4b of the panel supporting member 104.

A plurality of cover member attachment threaded holes 4c for attaching the cover member 5 are formed in the back surface of the panel supporting member 104. A plurality of screw insertion holes 5a are formed in the cover member 5. The cover member 5 is fixed to the panel supporting member 104 by fastening the screws 30 into the cover member attachment threaded holes 4c of the panel supporting member 104 through the screw insertion holes 5a of the cover member 5, respectively. As viewed from the back, the screw 30 fastened into the screw insertion hole 5a located at the upper left of the cover member 5 is fastened into the board attachment threaded hole 4a at the upper left of the panel supporting member 104 through the screw insertion hole 70a at the upper left of the circuit board 70.

Recessed portions 4d recessed toward the heat sink 110 are formed in portions of the panel supporting member 104 corresponding to the screw insertion holes 110d of the heat sink 110. Screw insertion holes 4e for attaching the screw 30 are formed in the recessed portions 4d. The panel supporting member 104 and the heat sink 110 are fixed (or pressed) to each other in a surface-contact state by fastening the screws 30 into the screw insertion holes 110d of the heat sink 110 through the screw insertion holes 4e of the panel supporting member 104.

The cover member 5 is attached by the screws 30 to the cover member attachment threaded holes 4c formed in the lower portion among the cover member attachment threaded holes 4c formed in the back surface of the panel supporting member 104 such that a speaker attachment member 117 is sandwiched therebetween. The two speakers 118 are attached to the speaker attachment member 117. Also, the cover member 5 is attached to cover the circuit board 70, the circuit board 80, and the speaker attachment member 117 to which the two speakers 118 are attached, from the back.

Figure 16:
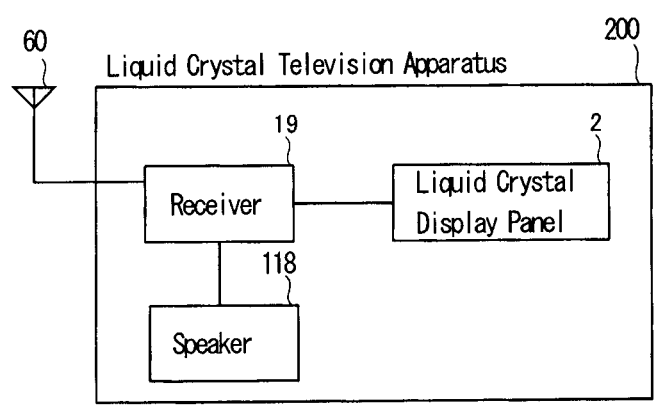
FIG. 16 is a block diagram of the liquid crystal television apparatus illustrated in FIG. 11.

The circuit board 80 for signal processing attached to the panel supporting member 104 has a receiver or tuner 19 capable of receiving a television broadcast. As shown in FIG. 16, in the liquid crystal television apparatus 200, the receiver 19 is connected to the liquid crystal display panel 2 and the speakers 118, and is configured to output to the liquid crystal display panel 2 a video signal from the television broadcast signal (video signal and audio signal) received by an antenna 60 and output an audio signal to the speakers 118.

In this embodiment, as described above, the drawing processing is conducted such that the boundary portions A1-A3 of the first, second and third drawn portions 110a, 110b and 110g of the heat sink 110 (or the boundary portions A4-A10 of the first, second and third drawn portions 911a, 913a and 915a of the reflection sheet holder 90a, the drawn portion 911b of the reflection sheet holder 90b, and the first, second and third drawn portions 911c, 912c and 914c of the reflection sheet holder 90c) with respect to the portion where the reflection sheet 11 and the heat sink 110 (or the reflection sheet holders 90a, 90b and 90c) abut each other have a radius of curvature larger than the thickness t1 (or t3, t4 and t2) of the sheet metal forming the heat sink 110 (or the reflection sheet holders 90a, 90b and 90c). Thus, the boundary portion of the drawn portion has a large radius of curvature, a surface of the boundary portion becomes gentle, and the boundary portion is prevented from being raised toward the reflection sheet 11. Consequently, a white spot can be prevented from occurring on the liquid crystal display panel 2 due to compression of the light guide plate 12 caused by compression of the reflection sheet 11. Here, in the case of sheet metal, the boundary portion of the drawn portion will easily be raised toward the reflection sheet 11. In order to prevent this situation, it is especially effective to make the radius of curvature of the boundary portion of the drawn portion larger than the thickness of the sheet metal forming the heat sink 110 (or the reflection sheet holders 90a, 90b and 90c) so as to make the surface of the boundary portion gentle.

In this embodiment, as described above, the boundary portions A1-A3 of the first, second and third drawn portions 110a, 110b and 110g of the heat sink 110 (or the boundary portions A4-A10 of the first, second and third drawn portions 911a, 913a and 915a of the reflection sheet holder 90a, the drawn portion 911b of the reflection sheet holder 90b, and the first, second and third drawn portions 911c, 912c and 914c of the reflection sheet holder 90c) have a radius of curvature that is three times or more and six times or less of the thickness (or t3, t4 and t2) of the sheet metal forming the heat sink 110 (or the reflection sheet holders 90a, 90b and 90c). Consequently, the surface of the boundary portion can securely be made gentle, the boundary portion of the drawn portion can securely be prevented from being raised toward the reflection sheet 11, and thus a white spot can securely be prevented from occurring on the liquid crystal display panel 2 due to compression of the reflection sheet 11.

In this embodiment, as described above, the reflection sheet 11 is held by the heat sink 110. Consequently, by using the heat sink 110 that releases heat generated from the LED light source 106a as a member for holding the reflection sheet 11, the number of parts can be reduced and a white spot can securely be prevented from occurring on the liquid crystal display panel 2.

In this embodiment, as described above, the reflection sheet holder 90a, the reflection sheet holder 90b, the reflection sheet holder 90c, and the heat sink 110 are configured to abut the reflection sheet 11 in a frame shape on the outer peripheral portion side of the display area (in the vicinity of the outer peripheral portion). Consequently, an area of the reflection sheet 11 corresponding to a central portion of the display area can be prevented from being compressed by the reflection sheet holder 90a, the reflection sheet holder 90b, the reflection sheet holder 90c, and the heat sink 110, and thus a white spot can securely be prevented from occurring in the central portion of the display area.

In this embodiment, as described above, the reflection sheet holder 90a, the reflection sheet holder 90b, the reflection sheet holder 90c, and the heat sink 110 are respectively provided in a frame shape along four sides of the display area of the liquid crystal display panel 2 (i.e., the sides in the arrow Z1 direction, the arrow Z2 direction, the arrow X1 direction, and the arrow X2 direction) (see the dashed line of FIG. 18), and press four sides of the reflection sheet 11 toward the light guide plate 12. Consequently, the outer peripheral portion of the reflection sheet 11 can easily be held by the reflection sheet holder 90a, the reflection sheet holder 90b, the reflection sheet holder 90c, and the heat sink 110 provided in a frame shape, and thus the reflection sheet 11 can easily be prevented from being displaced or moving.

In this embodiment, as described above, the outer edge portion 110e of the heat sink 110 on the center side of the display area (or the outer edge portions 914a, 912b and 913c of the reflection sheet holders 90a, 90b and 90c on the center side of the display area) is spaced apart from the reflection sheet without contacting the reflection sheet 11. Consequently, since the outer edge portion 110e of the heat sink 110 on the center side of the display area (or the outer edge portions 914a, 912b and 913c of the reflection sheet holders 90a, 90b and 90c) is spaced apart from the reflection sheet 11, a white spot can be prevented from occurring on the liquid crystal display panel 2 due to a situation where the outer edge portion 110e (or the outer edge portions 914a, 912b and 913c) compresses the reflection sheet 11.

In this embodiment, as described above, the panel supporting member 104 forming the rear chassis is provided at a predetermined distance from the reflection sheet 11 without contacting the reflection sheet 11 in an area corresponding to the display area. Consequently, since the reflection sheet 11 is prevented from being compressed by the panel supporting member 104 in the area corresponding to the display area, a white spot can be prevented from occurring on the liquid crystal display panel 2 due to a situation where the panel supporting member 104 compresses the reflection sheet 11.

In this embodiment, as described above, the panel supporting member 104 is provided at a distance of 1 mm or more from the reflection sheet 11 in the area corresponding to the display area. Consequently, a white spot can securely be prevented from occurring on the liquid crystal display panel 2 due to a situation where the panel supporting member 104 compresses the reflection sheet 11.

The embodiment described herein is in all respects merely examples, and shall not be construed as limiting the present invention. The scope of the present invention is defined by the claims and not by the above-described embodiments, and includes all equivalents to the claims and modifications within the intended scope thereof.

For example, in the present application, a liquid crystal television apparatus is described as an example of the display device or television apparatus. However, the present invention is not limited to this. For example, the present application can also be applied to a display device such as a monitor of a personal computer other than a television apparatus, or to a television apparatus other than a liquid crystal television apparatus.

In the above-described embodiment, the boundary portion of the drawn portion of the heat sink (or reflection sheet holder) with respect to the portion where the reflection sheet and the heat sink (or reflection sheet holder) abut each other has a radius of curvature that is three times or more and six times or less of the thickness of the sheet metal forming the heat sink (or reflection sheet holder). However, the present invention is not limited to this. For example, it is sufficient for the radius of curvature of the boundary portion of the drawn portion to be larger than the thickness of the sheet metal forming the heat sink and the reflection sheet holder.

In the above-described embodiment, the heat sink and the reflection sheet holders are provided in a frame shape, and the heat sink and the reflection sheet holders abut the reflection sheet in the outer peripheral portion of the liquid crystal display panel without abutting in the central portion of the liquid crystal display panel. However, the present invention is not limited to this. For example, the heat sink and the reflection sheet holders can abut the reflection sheet in the central portion of the liquid crystal display panel.

In the above-described embodiment, the metal heat sink and the metal panel supporting member made of sheet metal (SECC) are used. However, the present invention is not limited to this. For example, a heat sink or a panel supporting member made of a material such as aluminum other than sheet metal (SECC) can be used as long as it is possible to release heat generated from the LED light source or the heat generating element. Also, the thickness of the heat sink made of aluminum and the like can be larger (for example, 1.0 mm) than the thickness (0.6 mm) of the metal heat sink made of sheet metal (SECC). Consequently, heat generated from the heat generating element can be released effectively.

The display device according to a first aspect includes a light source, a reflection sheet and a reflection sheet holding member. The reflection sheet reflects light emitted from the light source to the front side that is a display screen side. The reflection sheet holding member abuts the reflection sheet from the back in the vicinity of an outer peripheral portion of a display area of a display screen and holds the reflection sheet. The reflection sheet holding member is made of a plate-shaped metal member, and has a drawn portion formed by conducting drawing processing to the plate-shaped metal member. The drawing processing is conducted such that a boundary portion of the drawn portion with respect to a portion where the reflection sheet and the reflection sheet holding member abut each other has a radius of curvature larger than a thickness of the plate-shaped metal member.

In the display device according to this first aspect, as described above, the drawing processing is conducted such that the boundary portion of the drawn portion with respect to the portion where the reflection sheet and the reflection sheet holding member abut each other has the radius of curvature larger than the thickness of the plate-shaped metal member. Thus, the boundary portion of the drawn portion with respect to the portion where the reflection sheet and the reflection sheet holding member abut each other has a large radius of curvature, a surface of the boundary portion becomes gentle, and the boundary portion of the drawn portion with respect to the portion where the reflection sheet and the reflection sheet holding member abut each other is prevented from being raised toward the reflection sheet. As a result, a white spot can be prevented from occurring on the display screen due to compression of the light guide plate caused by compression of the reflection sheet. Here, in the case of a plate-shaped metal member, the boundary portion of the drawn portion with respect to the portion where the reflection sheet and the reflection sheet holding member abut each other will easily be raised toward the reflection sheet. In order to prevent this situation, it is especially effective to make the radius of curvature of the boundary portion of the drawn portion larger than the thickness of the plate-shaped metal member so as to make the surface of the boundary portion gentle.

In the display device according to the above-described first aspect, the boundary portion of the drawn portion with respect to the portion where the reflection sheet and the reflection sheet holding member abut each other has the radius of curvature that is three times or more and six times or less of the thickness of the plate-shaped metal member. With this configuration, the surface of the boundary portion of the drawn portion with respect to the portion where the reflection sheet and the reflection sheet holding member abut each other can securely be made gentle, and the boundary portion can securely be prevented from being raised toward the reflection sheet. Consequently, white spot can securely be prevented from occurring on the display screen due to compression of the reflection sheet.

In the display device according to the above-described first aspect, the reflection sheet holding member includes a heat sink for releasing heat generated from the light source. With this configuration, by using the heat sink for releasing heat generated from the light source as the reflection sheet holding member, the number of parts can be reduced and a white spot can securely be prevented from occurring on the display screen.

In the display device according to the above-described first aspect, the reflection sheet holding member is configured to abut the reflection sheet in a frame shape on the outer peripheral portion side of the display area. With this configuration, an area of the reflection sheet corresponding to a central portion of the display area can be prevented from being compressed by the reflection sheet holding member. Thus, a white spot can securely be prevented from occurring in the central portion of the display area.

In this case, the reflection sheet holding member includes a plurality of reflection sheet holding portions. The reflection sheet holding portions are respectively provided in a frame shape along four sides of the display area, and configured to press four sides of the reflection sheet. With this configuration, the outer peripheral portion of the reflection sheet can easily be held by the plurality of reflection sheet holding portions provided in a frame shape. Thus, the reflection sheet can easily be prevented from being displaced or moving.

In the display device according to the above-described first aspect, at least a part of an outer edge portion of the reflection sheet holding member on the center side of the display area is spaced apart from the reflection sheet without contacting the reflection sheet. With this configuration, since at least a part of the outer edge portion of the reflection sheet holding member on the center side of the display area is spaced apart from the reflection sheet, a white spot can be prevented from occurring on the display screen due to a situation where the outer edge portion of the reflection sheet holding member on the center side of the display area compresses the reflection sheet.

In the display device according to the above-described first aspect, the display device further includes a supporting member that is arranged on a side of the reflection sheet holding member opposite to the reflection sheet and configured such that a part of the supporting member forms a rear chassis. The supporting member is provided at a predetermined distance from the reflection sheet without contacting the reflection sheet in an area corresponding to the display area. With this configuration, since the reflection sheet is prevented from being compressed by the supporting member in the area corresponding to the display area, a white spot can be prevented from occurring on the display screen due to a situation where the supporting member compresses the reflection sheet.

In this case, the supporting member is provided at a distance of 1 mm or more from the reflection sheet in the area corresponding to the display area. With this configuration, a white spot can securely be prevented from occurring on the display screen due to a situation where the supporting member compresses the reflection sheet.

The television apparatus according to a second aspect includes a receiver, a display panel, a light source, a reflection sheet and a reflection sheet holding member. The receiver is capable of receiving a television broadcast. The display panel displays the television broadcast received by the receiver. The reflection sheet reflects light emitted from the light source to the front side that is a display screen side. The reflection sheet holding member abuts the reflection sheet from the back in the vicinity of an outer peripheral portion of a display area of a display screen and holds the reflection sheet. The reflection sheet holding member is made of a plate-shaped metal member, and has a drawn portion formed by conducting drawing processing to the plate-shaped metal member. The drawing processing is conducted such that a boundary portion of the drawn portion with respect to a portion where the reflection sheet and the reflection sheet holding member abut each other has a radius of curvature larger than a thickness of the plate-shaped metal member.

In the television apparatus according to this second aspect, as described above, the drawing processing is conducted such that the boundary portion of the drawn portion with respect to the portion where the reflection sheet and the reflection sheet holding member abut each other has the radius of curvature larger than the thickness of the plate-shaped metal member. Thus, the boundary portion of the drawn portion with respect to the portion where the reflection sheet and the reflection sheet holding member abut each other has a large radius of curvature, a surface of the boundary portion becomes gentle, and the boundary portion of the drawn portion with respect to the portion where the reflection sheet and the reflection sheet holding member abut each other is prevented from being raised toward the reflection sheet. As a result, a white spot can be prevented from occurring on the display screen due to compression of the light guide plate caused by compression of the reflection sheet. Here, in the case of a plate-shaped metal member, the boundary portion of the drawn portion with respect to the portion where the reflection sheet and the reflection sheet holding member abut each other will easily be raised toward the reflection sheet. In order to prevent this situation, it is especially effective to make the radius of curvature of the boundary portion of the drawn portion larger than the thickness of the plate-shaped metal member so as to make the surface of the boundary portion gentle.

As described above, with the display device and the television apparatus a white spot can be prevented from occurring on the display screen due to compression of the reflection sheet.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A display device comprising:
    a light source;
    a reflection sheet that reflects light from the light source toward a front of the display device;
    a display panel;
    a supporting member supporting the display panel; and
    a cover member only partially covering a rear facing surface of the supporting member from a rear of the display device, with a part of the rear facing surface of the supporting member other than a covered part of the rear facing surface that is covered by the cover member from the rear of the display device exposing outside of the display device,
    the supporting member having a first recessed portion that is recessed toward the reflection sheet and contacts with a center portion of a back surface of the reflection sheet that is spaced inwardly from an outer edge of the reflection sheet, the first recessed portion being disposed in an area that is covered by the cover member with the cover member substantially covering the first recessed portion.

2. The display device according to claim 1, wherein
    an outer edge portion of a front facing surface of the first recessed portion that contacts with the back surface of the reflection sheet has a curved cross-sectional shape.

3. The display device according to claim 2, further comprising
    a heat sink disposed on a front side of the supporting member and outside the first recessed portion,
    the heat sink contacting with a vicinity of an outer peripheral portion of the back surface of the reflection sheet.

4. The display device according to claim 3, wherein
    the supporting member further has a second recessed portion that is recessed in a same direction as the first recessed portion.

5. The display device according to claim 4, wherein
    the second recessed portion surrounds the first recessed portion, and
    the cover member is fitted into the second recessed portion of the supporting member and covers the first recessed portion of the supporting member.

6. The display device according to claim 1, further comprising
    a circuit board disposed at a location that overlaps with the first recessed portion as viewed in a planar direction between the supporting member and the cover member.

7. A display device comprising:
a light source;
a reflection sheet that reflects the light from the light source;
a display panel;
a supporting member supporting the display panel, the supporting member being disposed on an opposite side of a display screen side of the display panel; and
a cover member partially covering a back surface of the supporting member,
the supporting member having a first recessed portion that is recessed toward the reflection sheet and contacts with a center portion of a back surface of the reflection sheet that is spaced inwardly from an outer edge of the reflection sheet, and a second recessed portion in which the first recessed portion is disposed, and
the cover member being fitted into the second recessed portion of the supporting member and covering the first recessed portion of the supporting member.

8. The display device according to claim 7, wherein
the cover member only partially covers the back surface of the supporting member.

9. A display device comprising:
a light source;
a reflection sheet that reflects the light from the light source;
a display panel;
a supporting member supporting the display panel; and
a cover member only partially covering the supporting member from a rear of the display device,
the supporting member having a first recessed portion that is recessed toward the reflection sheet and contacts with a center portion of a back surface of the reflection sheet that is spaced inwardly from an outer edge of the reflection sheet,
the cover member covering a covered part of the supporting member so that the cover member substantially covers the first recessed portion of the supporting member, a part of the supporting member other than the covered part exposing outside of the display device at the rear of the display device to form a rear chassis of the display device.

10. The display device according to claim 9, wherein
the center portion of the back surface of the reflection sheet that contacts with the first recessed portion has a length in a lengthwise direction that is equal to or greater than a half of an entire length of the supporting member in the lengthwise direction.

11. The display device according to claim 9, further comprising
a light guide plate that diffuses the light from the light source, the light guide plate being disposed on a front side of the reflection sheet,
a front facing surface of the first recessed portion of the supporting member is arranged to contact the reflection sheet with the light guide plate.

12. The display device according to claim 9, wherein
the supporting member is made of a plate member, and has a contact portion that contacts with the reflection sheet and a bulging portion that bulges relative to the contact portion, a boundary portion between the contact portion and the bulging portion having a radius of curvature that is larger than a thickness of the plate member.

13. The display device according to claim 12, wherein
the radius of curvature of the boundary portion is three times or more and six times or less than the thickness of the plate member.

14. The display device according to claim 13, wherein
the supporting member includes a heat sink that releases heat generated from the light source.

15. The display device according to claim 9, wherein
the center portion of the back surface of the reflection sheet that contacts with the first recessed portion has a length in a widthwise direction that is equal to or greater than a half of an entire length of the supporting member in the widthwise direction.

* * * * *